United States Patent [19]
Goodall et al.

[11] Patent Number: 5,468,819
[45] Date of Patent: Nov. 21, 1995

[54] PROCESS FOR MAKING POLYMERS CONTAINING A NORBORNENE REPEATING UNIT BY ADDITION POLYMERIZATION USING AN ORGANO (NICKEL OR PALLADIUM) COMPLEX

[75] Inventors: Brian L. Goodall, Fairlawn; George M. Benedikt, Solon; Lester H. McIntosh, III, Cuyahoga Falls; Dennis A. Barnes, Medina, all of Ohio

[73] Assignee: The B.F. Goodrich Company, Akron, Ohio

[21] Appl. No.: 153,250

[22] Filed: Nov. 16, 1993

[51] Int. Cl.$^6$ .................. C08F 4/80; C08F 4/76; C08F 4/78
[52] U.S. Cl. .......... 526/171; 526/82; 526/161; 526/164; 526/169; 526/177; 526/178; 526/179; 526/281; 526/282; 526/308
[58] Field of Search .................. 526/171, 281, 526/308, 169, 164

[56] References Cited

U.S. PATENT DOCUMENTS

| | | | |
|---|---|---|---|
| 2,721,189 | 10/1955 | Anderson et al. | |
| 3,330,815 | 7/1967 | McKeon | |
| 4,599,391 | 7/1986 | Yamamoto | 526/282 |
| 5,087,677 | 2/1992 | Bremer | 526/160 |

FOREIGN PATENT DOCUMENTS

| | | |
|---|---|---|
| 445755 | 9/1991 | European Pat. Off. |
| 504418A | 9/1992 | European Pat. Off. |

OTHER PUBLICATIONS

"Synthesis and Characterization of Poly(5-Alkyl-2-Norbornene)s by Cationic Polymerization" by T. Sagane et al Macromol. Chem. 4 37–52 (1993).
"Zietschrift fur Kristallographie" 201 287–289 (1992) by R. Kempe and J. Sieler.
Encyclopedia of Polymers Science and Engineering, 2nd Edition vol. 2, John Wiley & Sons (1985).
J. Polym. Sci., Polym. Chem., by U. Klabunde et al 25 1989 (1987).
"Homogeneous Catalysis: The Applications and Chemistry of Catalysis by Soluble Transition Metal Complexes" by G. W. Parshall & Ittel Makromol. Chem. 139 73 (1970) by R. Sakata et al, titled Effect of Unsaturated Hydrocarbons on the Polymerization of Butadiene, etc.

(List continued on next page.)

*Primary Examiner*—Fred Zitomer
*Attorney, Agent, or Firm*—Thoburn T. Dunlap; Nestor W. Shust; Alfred D. Lobo

[57] ABSTRACT

A single component ionic catalyst consists essentially of an organonickel complex cation, and a weakly coordinating neutral counteranion. The cation is a neutral bidentate ligand removably attached to a Group VIII transition metal in an organometal complex. The ligand is easily displaced by a norbornene-type (NB-type) monomer in an insertion reaction which results in an unexpectedly facile addition polymerization. A NB-type monomer includes NB or substituted NB, or a multi-ringed cycloolefin having more than three rings in which one or more of the rings has a structure derived from NB, and a ring may have an alicyclic alkyl, alkylene or alkylidene substituent. The insertion reaction results in the formation of a unique propagating species more soluble in a polar than in a non-polar solvent and devoid of an available β-hydrogen for termination. The ensuing propagation of a polymer chain proceeds without measurable unsaturation. The chain continues to grow until the insertion of a monoolefinic chain transfer reagent results in substantially all chains being terminated with the residue of the chain transfer reagent. This unique chain transfer reaction allows one to control the molecular weight in a relatively narrow range. The reaction mixture for controlling the mol wt of the polymer chains may contain any other catalyst which generates a propagating species by an insertion reaction in an essentially anhydrous solvent. Both, mol wt and glass transition temperature Tg are tailored to provide a weight average mol wt Mw>20,000 but preferably not greater than about 500,000, and a $T_g$ in the range from about 150° C. to about 400° C. or higher, if desired.

44 Claims, 3 Drawing Sheets

OTHER PUBLICATIONS

J. of Organometal. Chemistry by A. Sen, T. Lai and R. Thomas 358 567–568 (1988).

Makromol. Chem., Rapid Commun. 12 255–259 (1991) and 13 455–459 (1992) by C. Mehler, & W. Risse, title "The $Pd^{2'}$ Catalyzed Polymerizatin of Norbornene".

"Olefin Metathesis" by K. J. Ivin, Academic Press (1983).

Makromol. Chem, Macromol. Symp. 47 83 (1991) by W. Kaminsky et al.

J. Mol. Cat. 74 109 (1992) by W. Kaminsky et al.

Shokubai 33 536 (1991) by W. Kaminsky.

"Polypropylene and Other Polyolefins Polymerization and Characterization" by Ser van der Ven–Studies in Polymer Science–7, Elsevier (1990).

"Copolymers of Ethylene with Bicyclic Dienes" by Schnecko et al. Die Angewandte Makromolekulare Chemie, 20, 141–152 (1971).

Chim, Ind (Milan) by L. Porri, G. Natta & M. C. Gallazzi 46 428 (1964).

Stud. Surf. Sci. Catal. 56 425 (1990) by W. Kaminsky et al.

"The Organic Chemistry of Nickel" by P. W. Jolly & G. Wilke vol. I Academic Press, New York p. 352 (1974).

J. of Polymer Science, Part C, 1b p. 2525 (1967) by L. Porri, G. Natta and M. C. Gallazzi.

PROCESS FOR MAKING POLYMERS CONTAINING A NORBORNENE REPEATING UNIT BY ADDITION POLYMERIZATION USING AN ORGANO (NICKEL OR PALLADIUM) COMPLEX

BACKGROUND OF THE INVENTION

The well-known advantages of a polymer having chains containing directly linked polycyclic repeating units free of unsaturation, have driven those skilled in the art to search for a processable 'addition polymer' of one or more multi-ringed monoolefinically unsaturated cycloolefin monomers such as norbornene, bicyclo[2.2.1.]hept-2-ene or "NB" for brevity, and substituted embodiments thereof, such as ethylidenenorbornene or decylnorbornene, and particularly those monomers of NB having at least one substituent in the 5- (or 6-) positions. The foregoing monomers are collectively referred to herein as "norbornene-type" or "NB-type" monomers, for convenience, recognizing that, just as in NB, or substituted NB, each NB-type polymer is characterized by containing a repeating unit resulting from an addition polymerized derivative of bicyclo[2.2.1.]-hept-2-ene. A first NB-type or NB monomer may be polymerized by coordination polymerization to form (i) an addition homopolymer; or, (ii) with a second NB-type or NB monomer, either one (first or second) of which is present in a major molar proportion relative to the other, to form an addition NB-type copolymer; or, (iii) with a second monomer which is not an NB-type monomer, present in a minor molar proportion relative to the first, to form an addition copolymer with plural repeating units of at least one NB-type monomer.

Besides NB and substituted NB, a monomer with a NB-type configuration may be a multi-ringed cycloolefin having up to four fused rings, in which one or more of the rings may have an acyclic $(C_1-C_{20})$alkyl, $(C_1-C_{20})$haloalkyl, $(C_3-C_{20})$alkenyl, or $(C_1-C_6)$alkylidene substituent. Each chain of the addition polymer formed herein is characterized by having at least one non-styrenic terminal double bond. The addition polymer, substantially 2,3-enchained (based on Chemical Abstracts Service numbering), may be a homopolymer of a NB-type monomer; or, a copolymer of two or more NB-type monomers, e.g. NB and 5-dodecylNB; or, a copolymer of a NB-type cyclomonoolefin with a NB-type cyclodiolefin, e.g. NB or 5-hexy-1NB and dicyclopentadiene (DCPD); or, a copolymer of a NB-type monomer with a cyclomonoolefin e.g. NB or 5-decylNB and cyclopentene, cyclohexene or cyclooctene; or, a copolymer of a NB-type cyclomonoolefin with a non-NB type cyclodiolefin, e.g. NB or 5-decylNB and cycloheptadiene or cyclooctadiene.

Polynorbornene or "poly(bicyclo[2.2.1.]-hept-2-ene)" or polyNB for brevity, was originally produced a long time ago (U.S. Pat. No. 2,721,189). However this original material was found to contain two types of polymers, one brittle, the other thermoformable and 'drawable'. The brittle polymer was later found to be a low molecular weight ('mol wt') saturated polymer which was termed an addition type polymer; and, the thermoformable polymer was shown to be formed by ring opening metathesis polymerization ('ROMP'). A ROMP polymer has a different structure compared with that of the addition polymer in that (i) the ROMP polymer of one or more NB-type monomers, contains a repeat unit with one less cyclic unit than did the starting monomer, and, (ii) these are linked together in an unsaturated backbone characteristic of a ROMP polymer and is shown below.

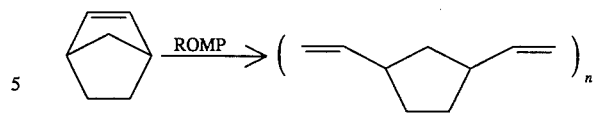

It will now be evident that, despite being formed from the same monomer, an addition-polymerized polyNB is clearly distinguishable over a ROMP polymer. Because of the different (addition) mechanism, the repeating unit of the former has no backbone C=C unsaturation while that of a ROMP always does.

The difference in structures of ROMP and addition polymers of NB-type monomers is evidenced in their properties, e.g. thermal properties. The addition type polymer of NB has a high $T_g$ of about 370° C. The unsaturated ROMP polymer of NB exhibits a $T_g$ of about 35° C., and exhibits poor thermal stability at high temperature above 200° C. because of its high degree of C=C unsaturation.

Some time later, reaction conditions were optimized so as to enable one to choose, and selectively make, either the low mol wt addition polymer, or the ROMP polymer. In U.S. Pat. No. 3,330,815, the disclosure taught that only the addition polymer was synthesized with $TiCl_4/Et_2AlCl$ or $Pd(C_6H_5CN)_2Cl_2$, under particular conditions, except that the polymers produced were only those in the mol wt range from 500 to 750 in which range they were too brittle for any practical application.

Very recently, the addition polymer of norbornene was found to have been produced in two forms. The first form is an amorphous polymer which shows a glass transition temperature of about 370° C. It is this amorphous addition polymer of one or more NB-type monomers which is the subject of this invention. The second form was found to be a highly crystalline form of a "norbornene-addition polymer", that is, an addition polymer of a NB-type monomer, which polymer is totally insoluble in halohydrocarbons and aromatic solvents, and reportedly does not melt until it decomposes at ≈600° C. (under vacuum to avoid oxidation). It is therefore unprocessable. (W. Kaminsky et al., J. Mol. Cat. 74, (1992), 109; W. Kaminsky et. al. Makromol. Chem, Macromol. Symp., 47, (1991) 83; and W. Kaminsky, Shokubai, 33, (1991) 536.). This second form has only been shown to be produced with "zirconocene type" catalysts such as those taught by Kaminsky et al, and others, all well known to those skilled in the art. An added distinguishing characteristic of the zirconocene catalyst system is that it catalyzes the copolymerization of ethylene and norbornene. In such copolymers, the amount of NB incorporated into the ethylene/NB copolymer can be varied from high to low (W. Kaminsky et. al. Stud. Surf. Sci. Catal. 56, (1990), 425).

The catalyst of our invention does not incorporate ethylene into the polymer formed, except one mole per chain, at only one terminal end thereof. As will presently be evident, the term "catalyst" is used because the function of the organometal complex is that of both an initiator of a chain as well as that of its termination by inciting β-hydride elimination. Moreover, the term "catalyst" is routinely used in the art to describe complexes such as this, recognizing what the function of the organometal complex in the polymerization reaction actually is. The polymer formed with a zirconocene catalyst can incorporate ethylene in its backbone, randomly, whether in runs of a multiplicity of repeating units, or even a single unit. It should also be noted that the ionic metallocene catalysts, such as zirconocene and hafnocene in combination with the same or different cyclopentadienyl rings use metals from Group IVB as the cation with a compatible weakly coordinating anion. These catalysts are entirely distinct from the catalysts used in this invention.

The phrase "compatible weakly coordinating anion" refers to an anion which is only weakly coordinated to the cation, thereby remaining sufficiently labile to be displaced by a neutral Lewis base. More specifically the phrase refers to an anion which when functioning as a stabilizing anion in the catalyst system of this invention does not transfer an anionic substituent or fragment thereof to the cation, thereby forming a neutral product. Compatible anions are anions which are not degraded to neutrality when the initially formed complex decomposes.

The preformed, single-component Ni-complex catalyst used in this invention, in combination with a predetermined amount of an olefin with a terminal double bond, functions as an efficient chain transfer agent (CTA), and reliably produces melt-processable higher mol wt polymers of predetermined weight average molecular weight $M_w$ in the range from about 1,000 to about 2,000,000 or more. By "olefin with a terminal double bond" we refer to an olefin which has a $CH_2=CH-R'$ structure, wherein $R'$ represents hydrogen or a hydrocarbyl group.

The $M_w$ range given above is determined relative to polystyrene by GPC (gel permeation chromatography). The absolute $M_w$ as determined by GPC/Low Angle Light Scattering in cyclohexane at room temperature (22° C.) with a smoothed Light Scattering calibration curve, is about 1.5 times higher in the mol wt range from about 18,000 to $10^6$. Above this range, because of "exclusion", the ratio 1.5 is less reliable.

A NB-type polymer with a $M_w$ which is controllable within a desired relatively narrow range, is produced by using a hydrocarbon with a single olefinic double bond, most preferably an α-olefin, as a CTA in a minor amount relative to the cycloolefins being polymerized, and proportioned to provide the desired mol wt, the more olefin used, the lower the mol wt of the copolymer. The resulting cycloolefin (co)polymer has a characteristic terminal double bond which results from a β-hydride elimination reaction terminating a propagating chain. Such chain transfer is of the type described in typical Ziegler-Natta olefin polymerization and results in each chain formed having an olefinic termination, the double bond being nearest the last cyclic repeating unit. See Polypropylene and other Polyolefins Polymerization and Characterization by Ser van der Ven, *Studies in Polymer Science* 7, Elsevier Amsterdam, etc. 1990, Chapter 1 POLYPROPYLENE; CATALYSTS AND POLYMERIZATION ASPECTS by Brian L. Goodall, and Section 1.6 thereof titled "The Effect of Catalyst and Process Variables on the Molecular Weight and its Distribution ("Chain Transfer"), and particularly Section 1.6.3 *On The Mechanism of Chain Transfer*, pg 82–83].

An attempt to copolymerize a $C_4$–$C_{12}$ olefin with a typical monoolefinically unsaturated monomer such as styrene in a Ziegler-Natta polymerization is unsuccessful because the double bond is essentially unavailable, and the olefin cannot function as a CTA. However, when the olefin is ethylene in the polymerization of a NB-type monomer, the ethylene ends up as vinyl end group. If the chain of addition-polymerized cycloolefin repeating units is not too long, the vinyl end group affords a polymerizable macromonomer or oligomer having from about 4 to 50, preferably from 4 to 20 NB-type repeating units (referred to as a "20-mer"). The mechanism by which an α-olefin affects both, initiation and propagation rate, in a different polymerization system, namely, the cobalt-catalyzed polymerization of butadiene (to butadiene rubber) was known, as stated by Goodall supra, at pg 83, but the rate at which the reaction occurs, and the amount of butadiene which is incorporated in the rubber chains is not predictable, necessitating the presence in the reactor, of a major molar amount of α-olefin relative to the butadiene. From the foregoing considerations there is no basis in the art to predict the effect of an α-olefin on the polymerization of a NB-type monomer.

Thus, to make a polyNB macromonomer having a $M_w$ in the range from 500 to 3,000 (corresponding to from 4 to about 20 linked repeating units), one simply uses the calculated molar amount of olefin, based on the desired chain length, for the CTA. In an analogous manner, a melt-processable polymer in the range from 20,000 to 500,000, more preferably, from 50,000 to 500,000, is made by using a proportioned amount of olefin, and if desired, even higher mol wts which are not melt-processable. The ease with which either a macromonomer, or a melt-processable (co)polymer is made, is a function of the characteristics of the particular cycloolefin species being (co)polymerized.

Research has continued toward the production of a melt-processable addition polymer of a NB-type monomer, and is the subject of an on-going effort. By "melt-processable" it is meant that the polymer is adequately flowable to be thermoformed in a temperature window above its $T_g$ but below its decomposition temperature. To date, there has been no disclosure of how to solve the many problems inherent in the production of a heat-resistant, yet thermoformable and processable polymer of a NB-type monomer which polymer can be extruded, injection molded, blow molded, and the like, using conventional equipment. This invention provides such polymers. For obvious reasons, crystalline NB polymers which do not melt and are insoluble in conventionally used solvents are unsuitable for such "forming" or "drawing" operations.

To date, we know of no practical or reliable method for commercially producing an amorphous NB-addition polymer with controlled mol wt. Polymers formed with too low a mol wt are too brittle to be thermoformed. Polymers with too high a mol wt can only be cast from solution and are not thermoformable. The goal has been to produce an addition polymer having a mol wt $M_w$ in the range of 50,000 to 500,000, using only one or more NB-type monomers, in a reliably controlled manner. The only method available to produce such a polymer has been through premature deactivation of the catalyst systems which produce amorphous polymers of NB, the homopolymers having mol wts in the millions. Predictably, this method of mol wt control leads to low catalyst productivity and requires the use of high catalyst levels when the mol wt $M_w$ is in the range from about 150,000–350,000. Since the problem of forming a processable NB-type polymer was never solved, the second, equally serious problem of obtaining a useful or practical level of conversion was never addressed.

A few years ago the reactivity of cationic, weakly ligated, transition metal compounds was studied in the polymerization of olefins and strained ring compounds, (A. Sen, T. Lai and R. Thomas, J. of Organometal. Chemistry 358 (1988) 567–568, C. Mehler and W. Risse, Makromol. Chem., Rapid Commun. 12, 255–259 (1991)). Pd complexes incorporating the weakly ligating $CH_3CN$ (acetonitrile) ligand in combination with a weakly coordinating counteranion could only be used with aggressive solvents such as acetonitrile or nitromethane. When Sen et al used the complexes to polymerize NB, a high yield of a homopolymer which was insoluble in $CHCl_3$, $CH_2Cl_2$ and $C_6H_6$, was obtained.

The identical experimental procedure, with the same catalyst and reactants, when practiced by Risse et al used one-half the molar amount of each component. Risse et al reported the synthesis of a polyNB homopolymer which had a mol wt $M_n$ of 24,000. In other runs, using different ratios of NB to $Pd^{2+}$-compound, polyNBs having mol wts $M_n$ of 38,000 and 70,000 respectively with narrow dispersities $M_w/M_n$ in the range from 1.36 to 1.45, and viscosities in the range from 0.22 to 0.45 were made. A homopolymer which had a viscosity of 1.1 was synthesized, which upon extrapolation from the mol wt data given for the prior runs, indicates the $M_w$ was over $10^6$. See Mehler and Risse Makromol. Chem., Rapid Commun. 12, 255–9 (1991), experimental section at the bottom of page 258 and the GPC data in Table 1 on pg 256. The polymers were soluble in 1,2-dichlorobenzene in which Risse el. al. measured mol wts by GPC (gel permeation chromatography) and viscosimetry, as did Maezawa et al in EP 445,755A, discussed below.

Maezawa et al disclosed the production of high mol wt NB polymers with a two-component catalyst system. The disclosure states that the polymer is preferably formed in the range from $10^5$ to $10^7$. The manner of obtaining the desired mol wt is shown to be by terminating the polymerization reaction after a predetermined period. Such termination is effected by decomposing the catalyst with an external terminating agent such as acidified methanol, which is added to the reaction to stop the polymerization. There is no internal control of the mol wt within a predetermined range by an agent that does not deactivate the catalyst.

Specifically, three known methods of controlling the mol wt are suggested: (i) varying the amount of the transition metal compound used; (ii) varying the polymerization temperature; and (iii) using hydrogen as a chain transfer agent "CTA" (see page 9, lines 20–23 of the '755A reference) as suggested by Schnecko, Caspary and Degler in "Copolymers of Ethylene with Bicyclic Dienes" Die Angewandte Makromolekulare Chemie, 20 (1971) 141–152 (Nr.283). Despite the foregoing suggestions, there is no indication in '755A that any of them was effective, as is readily concluded from the illustrative examples in the specification. As stated in their illustrative Example 1 in which the catalyst included a combination of nickel bisacetylacetonate ('Ni-$acac_2$') and methaluminoxane ("MAO"), a polyNB having $M_w=2.22\times 10^6$ (by GPC) was formed. As shown in Table 1 of the '755A reference, only Exs. 5, 6 and 7, in which the (triphenylphosphine)Ni-containing catalysts were used, made homopolymers with $M_w=234,000$; 646,000; and 577,000 respectively. These nickel catalysts with a triphenylphosphine ligand, are shown to have relatively lower productivity than the biscyclooctadienylnickel (Ex 3) and biscyclopentadienylnickel (Ex 4) which were also used.

One is therefore led to conclude that only those Ni-based catalysts which have substantially lower productivity than Ni$(acac)_2$ with a MAO catalyst system would effectively decrease the mol wt of the homopolymer produced. There is no suggestion that any of the polymers disclosed in the '755A reference are likely to be melt-processable. A conclusion that they are not melt-processable is supported by the evidence that all the polymers made by Maezawa et al were cast from solution.

A key aspect of the '775A disclosure was that the catalyst system disclosed was a combination of at least two components, namely, a transition metal complex catalyst, and a methaluminoxane co-catalyst. Maezawa et al used this multicomponent catalyst system to produce the high mol wt polymers in the range above $5\times10^5$. It was critical that the transition metal component in the complex be from Groups VB, VIB, VIIB, and VIII, and that it be paired with the methaluminoxane co-catalyst in order to produce polymer in a reasonable yield. The criticality of the co-catalyst was confirmed by illustrative examples of transition metal compounds which were generally catalytically effective only so long as methaluminoxane was the co-catalyst (Comparative Examples 3, and 4). The experimental evidence indicated that attaining a high productivity catalyst system was limited to specific nickel complexes in combination with MAO as the activator. All the illustrative examples having been run in toluene, it is evident that they were unaware that a polar solvent such as a halocarbon, acetonitrile, propylene carbonate, and the like, might improve productivity.

It is evident that the results obtained with the '755A catalyst/cocatalyst system are different from those with a Group VIII metal catalyst in which the metal is weakly ligated to displaceable ligands and a portion of a ligand generates a σ-bond. Whether the σ-bond-generating ligand has an allyl group or a canonical form thereof, the allyl metal linkage provides the initial metal-C σ-bond into which successive NB-type moieties are inserted to form a polymer chain. This insertion reaction is well known in the analogous propagation of ethylene in Ziegler Natta catalysis described in detail in the text Comprehensive Organometallic Chemistry edited by Geoffrey Wilkinson et al, in a chapter titled "Ziegler-Natta Catalysis" by Gavens et al, pg 484 et seq. Allyl-Ni cationic complexes have been synthesized for the polymerization of butadiene, but an allyl-Ni-cyclooctadiene ("allyl-Ni COD") cation complex was reported not to be catalytically active (see text, The Organic Chemistry of Nickel P. W. Jolly and G. Wilke, Vol I Academic Press New York, 1974 pg 352).

On the other hand, it has long been recognized that cationic nickel compounds are active catalysts for the polymerization of butadiene (R. Taube, et al Makromol. Chem., Macromol. Symp. 66, (1993) 245; L. Porri, G. Natta, M. C. Gallazzi, J. of Polymer Sci. Pt C. 16 (1967) 2525). Taube et al state "The chain growth proceeds by the insertion of butadiene into the allyl nickel bond always with formation of the new butenyl group in the 'anti' configuration (anti insertion)." The coordination of an allyl type ligand to the nickel is maintained continuously throughout the butadiene polymerization. This mechanism is clearly distinguishable from the insertion mechanism of a NB-type monomer in which insertion of only the very first monomer molecule occurs at an allyl type ligated metal center.

Allylnickelhalides alone (no Lewis acid co-catalyst) have been used to produce polyNB, however the molecular weights of the NB polymer produced in these studies were actually low; e.g. 1000 to 1500 mol wt. (L. Porri, G. Natta, M. C. Gallazzi Chim, Ind (Milan), 46 (1964),428). It had been thought that the low yields and the low mol wts of the polyNB were due to deactivation of the catalysts.

To the best of our knowledge, a norbornyl-Pd cation complex has never been prepared before, for any reason, nor have analogous complexes of Fe, Co, Ru, Rh, Os, Ir or Pt. Such complexes provide a π-bond from an olefin (specifically, from the olefin's double bond), and a σ-bond from a distal C-atom, spaced apart from an olefinic C-atom by at least two single bonds. We recognized that, as used herein, a Group VIII metal cation complex, like a Ni or Pd cation complex, is effective because of the allyl ligand. Both cations initiate and maintain chain growth of a NB-type monomer by the same mechanism, namely one in which the insertion reaction of each successive monomer moiety occurs in the same manner. Neither cation generates a polymer chain of a NB-type monomer in which chain transfer can readily occur, since in each case, the polymer chain generated does not have an available 'syn' β-hydrogen for elimination.

Still more recently, in a lone example of the use of a nickel catalyst as a transition metal equivalent to zirconium, Okamoto et al disclosed the production of high mol wt norbornene polymer with a three component catalyst system in example 117 on page 46 of EP 504,418A. The three-component catalyst was made in situ by combining triisobutylaluminum; dimethylanilinium tetrakis(pentafluorophenyl)borate; and, $Ni(acac)_2$ in toluene. The polymer recovered had a $M_w=1.21 \times 10^6$ and a mol wt distribution of 2.37. Though essentially the entire specification is directed to the copolymerization of cycloolefins with α-olefins using zirconium-containing catalysts, Okamoto et al failed to recognize why they were only able to make a homopolymer of norbornene with a nickel catalyst which, the evidence showed, was different from a zirconium catalyst by its demonstrated distinguishing effect. Though numerous nickel compounds are disclosed in the '418 reference (pg 7, lines 45–52), all but two, allyl(cyclopentadienyl)nickel and bis-(cyclooctadiene)nickel, produce no addition polymer in the absence of an alkylaluminum.

The failure to recognize that an α-olefin might function as a CTA, with or without the presence of an aluminalkyl co-catalyst, was understandable since there existed a large body of work related to the copolymerization of cycloolefins with α-olefins, and in none of such polymerizations was there any disclosure that the α-olefin might function as an effective CTA. Further, the great reactivity of ethylene or propylene buttressed an expectation that copolymerization, not chain transfer, is the logical and expected result. That this expectation was unequivocal is evidenced by the reality, that, had a polymerization of a multi-ringed cycloolefin, e.g. NB, been carried out under conditions in which the α-olefin would have supplied a chain transfer function, the explosive speed of the reaction under normal circumstances would certainly have attracted the attention of the experimenters, as it did ours. To avoid the explosive speed, the polymerization is carried out in a high-boiling solvent present in a large excess, and the reactor is cooled to slow down the reaction.

In particular, the prior art provides no basis to expect the formation of a propagating species by an active insertion-reaction of a NB-type monomer to initiate a "propagating species" generated by a pre-formed, single-component complex in which there is no MAO present. Such a preformed single-component complex may be formed in solution, in situ, and added to one or more monomers; or, the preformed single-component complex may be recovered from solution as a solid, then added to the monomer(s). In either form, whether as solution or as solid, the preformed single-component complex necessarily has a Group VIII metal in combination with a labile bidentate ligand.

Since practical consideration relating to melt-processing cycloolefin addition polymers produced herein, dictate that their mol wt be controlled within one order of magnitude, e.g. in the range from 50,000 to 500,000, it is evident that the '755A invention was unable to provide either a solution to the problem, or even an enabling disclosure to solve it. They do not suggest they can reliably make a reproducible polymer in the defined mol wt range. They suggest the use of hydrogen as CTA, and provided no reason to explore using another, least of all a CTA with a terminal non-styrenic double bond.

Neither is there any basis for estimating the effect of an α-olefin as a CTA in an insertion reaction, particularly insofar as the α-olefin is effective to tailor the mol wt of the growing polymer chains in an addition polymerization, irrespective of whether a second component such as MAO is used in a complex catalyst of the type taught by Maezawa.

An acyclic olefin, e.g. 1-hexene, is known to be an effective CTA in the ROMP of cyclic olefins, to reduce mol wt via a cross-metathesis mechanism. ROMP involves a metal carbene (or metal alkylidene) active center which interacts with the cyclic olefin monomer to afford a metallocycloalkane intermediate. A repeating unit contains a C=C double bond for every C=C double bond in the monomer. How effectively the acyclic olefin reduces the mol wt of the copolymer formed depends on the structure of the olefin and on the catalyst system (K. J. Ivin, Olefin Metathesis, Academic Press, 1983). In contrast, addition (or vinyl type) polymerization of olefins and diolefins involves the insertion of the monomer into a metal-carbon σ-bond, as in Ni—C, or Pd—C. Despite the many disclosures relating to the formation of copolymers of NB-type monomers, and the well-known fact that an olefin is an effective chain transfer agent in a ROMP polymerization, it will now be evident why the difference in the mechanisms of chain termination failed to suggest the use of an olefin as a chain transfer agent in the copolymerization taught herein.

The critical function of the CTA containing an olefinic bond will be better appreciated in light of the known complexity of phenomena which govern the control of the mol wt of polymers made by transition metal catalyzed polymerization of olefinic substrates to produce saturated addition type polymers.

It is recognized that the known mechanism of "β-hydride elimination" will provide the double bond near the terminal end of the polymer chain. In this mechanism which modulates the mol wt of olefinic polymers, a metal bonded to a hydrocarbyl radical with hydrogens on the carbon β to the metal, can undergo a reaction where the β-hydrogen is abstracted to the metal, leaving an olefinic group. This results in an unsaturated polymer chain and the metal hydride. In general, the rate of β-hydride elimination vs. the polymerization rate, controls the molecular weight of the polymer. For most polymerization catalyst systems, the proclivity of the catalyst system toward β-hydride elimination must be extensively researched and is not predictable. The polymer mol wt depends upon a host of process variables: the choice of monomer or monomers, the ligand environment around the transition metal, the presence of additional donor ligands, type of catalyst (homogeneous or heterogeneous), presence or absence of a co-catalyst (and choice thereof), and polymerization medium (bulk, solution, slurry, gas phase), inter alia.

For example, nickel catalysts have been used in the polymerization of ethylene. Depending upon the Ni catalyst chosen, it is possible to generate exclusively the dimer (1-butene), higher olefins (oligomers), or high mol wt polyethylene. Homogeneous Ni catalysts for the polymerization of ethylene to high mol wt polyethylene have been described by Klabunde et al. (U. Klabunde et al., J. Polym. Sci., Polym. Chem., 25 p 1989 (1987)) and Ostoja Starzewski (P. W. Jolly and G. Wilke, Vol 2, supra) where the polymer mol wt is controlled by the ligand environment around the nickel and the choice of reaction medium. The polymerization of ethylene or propylene has been reported to occur in the presence of a variety of different nickel containing Ziegler catalysts and singlecomponent nickel catalysts, while other nickel catalysts give only dimers (see P. W. Jolly and G. Wilke, Vol 2, supra). Shell Oil Co. uses a nickel-catalyzed oligomerization of ethylene to manufacture linear α-olefins on a large scale (see G. W. Parshall and S. D. Ittel, Homogeneous Catalysis: The Applications and Chemistry of Catalysis by Soluble Transition Metal Complexes, John Wiley and Sons, 1992).

It is noted that nickel catalysts have been used in the polymerization of butadiene where the solvent is neither a chlorohydrocarbon nor an aromatic solvent such as toluene or xylene. With some catalysts, the microstructure of the polymer is a function of its mol wt. With others, unsaturated hydrocarbons such as acetylenes and allenes retard initiation and propagation and enhance chain transfer, but do not affect microstructure (see Encyclopedia of Polymer Science and Engineering Second Edition, Vol 2; John Wiley and Sons, 1985).

However monoolefins were reported to have no effect on the polymerization of butadiene, at least when the amount added is relatively small (see R. Sakata, J. Hosono, A. Onishi and K. Ueda, Makromol. Chem., 139 (1970) 73). Still other nickel catalysts (with different ligand environments) give only (cyclic) dimers and trimers, such as "COD" and cyclododecatriene ("CDT").

From the foregoing, one would not expect that an olefin would function as an efficient and selective CTA in the addition polymerization of NB-type monomers. It is even more surprising that an olefin is a highly effective CTA in NBE-type polymerizations with catalysts based only on particular Group VIII transition metals.

Most preferably, a polymer in the $M_w$ range from about 50,000 to 250,000 is produced which is readily processable with conventional thermoforming techniques, though tailored polymers with even higher $M_w$ are processable if a monomer is substituted with an alkyl, alkylene or alkylidene substituent. Which substituent is chosen, along with the number of carbon atoms (number of aliphatic carbon atoms) in the chosen substituent, determines the processability and toughness of the polymer.

The polymer produced is preferably thermoformed by extruding it to form articles of arbitrary size and shape, both for optical and non-optical uses. The former use includes molding into lenses, or for example, sheets which are used as components of a flat panel display, or, for multichip modules in which electronic components are sealed. Sheets, tubes and other forms of arbitrary length and cross-section may also be formed by extruding the polymer. Because of the controllable mol wt of the polymer, such forms may be adapted for use as membrane means for the separation of gas from liquid, as in pervaporation membranes; or, in the separation of liquids having different molecular weights as in nanofiltration or reverse osmosis membranes. The polymer produced may also be blended with polyolefins and rubbers to provide toughness and other properties. Such blends are useful to make automobile components such as bumpers, dashboards and for under-the-hood components; and, to make rotors for washing machines, and liners for other appliances such as refrigerators.

If desired, the copolymer of NB-type comonomers may have a high mol wt $M_w$ in the range from 200,000 to 500,000, yet be melt-processable in a desired temperature in the range from 200°–400° C. if a sidechain, specifically, a substituent of known length, is provided on at least one of the monomers. The longer the sidechain, the lower the $T_g$ of the polymer, so that for a melt-processable copolymer with a $M_w$ of about 200,000 only one of the comonomers may have a $T_g$-lowering substituent; for a $M_w$ of 500,000, preferably each such substituted comonomer has a $T_g$-lowering substituent. The effect of an alkyl substituent on the $T_g$ of a copolymer was disclosed in an article titled "Synthesis and characterization of poly(5-alkyl-2-norbornene)s by cationic polymerization. Effect of alkyl substituent length on monomer reactivity, polymer structure and thermal properties" by T. Sagane et al, Macromol. Chem. 4, 37–52 (1993). However, the copolymers were made with a $AlEtCl_2$/tert-butyl chloride catalyst system, and the mol wt $M_w$ of the longest chain made was less than 2500. There was no suggestion that any other complex metal system, or any other catalyst system might yield higher mol wts.

It should be noted that the structure of the Ni-cyclodiolefin complex has been investigated in the interest of exploring numerous transition metal complexes with weakly ligated compounds in combination with a counteranion. Such a study was published by R. Kempe and J. Sieler in Zeitschrift fur Kristallographie 201, 287–289 (1992) who did not suggest it would have catalytic activity. Also known are compounds related to $(\pi-C_3H_5NiCl)_2 \cdot TiCl_4$, which compounds are formed by reacting π-allylnickel halides with strong Lewis acids (e.g. $AlBr_3$), and these are used for the polymerization of butadiene and the dimerization of olefins. There was no logical reason from known facts about nickel catalysts which would suggest the use of the known metal complex as a particularly effective catalyst for NB-type monomers.

SUMMARY OF THE INVENTION

The common source of a processability problem with known addition cycloolefin (co)polymers having a repeating unit with a NB-type structure is that they are not melt-processable. (Co)polymers having a mol wt lower than about 20,000 are brittle and therefore not melt-processable; and, those having a mol wt above about 500,000 are not thermoformable. Neither are melt-processable. In each case, the problem stems from an inability to control the growth of the polymer chains. This inability is endemic to all known polymerization systems for the addition polymerization of norbornene-type monomers. Therefore, when the problem of forming a melt-processable polymer of a NB-type cycloolefin monomer was addressed, neither the essential components of an appropriate catalyst nor its structure could be deduced from known catalysts used for the purpose at hand. This purpose is to produce homopolymers of a multi-ringed cycloolefin, or, a copolymer of first and second multi-ringed cycloolefins, or, a copolymer of a multi-ringed cycloolefin and another cycloolefin. We have provided a catalyst specifically adapted for use in the addition coordination polymerization of processable homopolymers and copolymers of cycloolefins, effected in solution or in slurry. By processable is meant that the polymers and copolymers of this invention are soluble, tractable, or thermoformable.

In "solution", we refer not only to a polymerization in the classical sense where initiator, catalyst, reactants and reaction products are in solution, in a single phase, but also to polymerization in which a phase of microparticles smaller than 1 μm are present, which particles are so small, typically less than 0.1 μm, as to behave as a single phase. Such a two-phase reaction mass is referred to as a colloidal solution. In "slurry", we refer to polymerization in which (i) the presence of polymer is evidenced by a distinct separate phase which typically precipitates out of solution; or (ii) catalyst is anchored to an "active" support, irrespective of the phase in which the polymer is present. An "active" support is one which exhibits a distinct contribution with respect to the polymer formed, compared with an "inert" or "inactive" support such as alumina which fails to exhibit such contribution.

A novel, essentially anhydrous, reaction mixture of a NB-type monomer and any pre-formed single component complex metal catalyst has been found to propagate polymer chains of controllable mol wt, provided the catalyst initiates a polymer chain by an insertion reaction of the monomer, and this occurs in the presence of a predetermined amount of a non-styrenic monoolefinic chain transfer agent ("CTA"). By "essentially anhydrous" is meant that there is no more than 1% by weight of moisture present in the polymerization reaction mixture, and preferably less than 0.1%. This reaction mixture is remarkable because it does not require purified monomers; nor is the reaction mixture sensitive to the presence of organic impurities which are not highly reactive with the catalyst. This property is unlike that of catalysts containing an effective transition metal from "the other side" of the Periodic Table, specifically, such as zirconocene, hafnocene and titanocene catalysts. These "other side" catalysts are well known to be totally ineffective in the presence of even trace amounts of water as low as 10 ppm, and sensitive to a wide variety of reactive functions requiring uneconomic purification of monomers.

More specifically, the reaction mixture is most preferably a solution of a pre-formed, single-component ionic catalyst of nickel or palladium with a NB-type monomer, in combination with a predetermined minor molar amount of an olefinic CTA relative to the moles of monomer in the mixture, in the absence of a cocatalyst such as an aluminoxane (e.g. MAO), or an aluminum alkyl (e.g. triethylaluminum, diethylaluminum, diethylaluminum sesquichloride, and the like), though other specific Group VIII transition metals ("M") produce some copolymers, but less effectively. By the term minor molar amount as used throughout the specification is meant that the moiety (e.g., comonomer or CTA) is present in a molar amount of less that 50 percent. By the term major molar amount as used throughout the specification is meant that the comonomer moiety is present in a molar amount of greater than 50 percent. The CTA is either ethylene or a compound having a single olefinic non-styrenic double bond between adjacent carbon atoms which together have at least 3 hydrogen atoms. When the CTA has 4 H atoms, it is ethylene; when the CTA has 3 H atoms, the CTA is either an α-olefin, or contains an α-olefinic moiety. Examples of CTA's are linear $C_2$–$C_{20}$ α-olefins, branched acyclic $(C_4$–$C_{20})$α-olefins, and $(C_5$–$C_{12})$-cyclomonoolefin having a hydrocarbyl sidechain with a single terminal double bond wherein said hydrocarbyl sidechain is selected from a $(C_2$–$C_{20})$α-olefin.

The pre-formed single component organometal complex catalyst is represented by

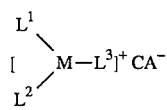

structure I wherein,

M represents a Group VIII metal, preferably a metal selected from the group consisting of Ni and Pd;

$L^1$, $L^2$ and $L^3$ represent ligands, which separately, or, two, or all three together, provide up to three (3) π-bonds and a single metal-C σ-bond to M; and $L^1$, $L^2$ and $L^3$ may each be the same, or different, and when different, provide three individual ligands; or, two of the three ligands may be portions of an individual ligand; or, all three ligands may be portions of the same ligand; and, CA⁻ represents a weakly coordinating counter anion chosen to solubilize the cation in an inert, that is, non-reactive, cosolvent for all reactants.

The reaction mixture most preferably consists of a single phase which may include a colloidal solution. Alternatively, the reaction may be effected in a heterogeneous system with a heterogeneous catalyst, illustrated in particular by one anchored to an "active" support such as aluminum fluoride to control the morphology of the polymer formed.

The single component catalyst consists essentially of (i) a cation of said organo "M" complex most preferably consists of a single "M", preferably Ni or Pd atom, and (ii) a weakly coordinating counteranion; the cation has a hydrocarbyl group directly bound to "M" by a single metal-C σ, and also by at least one, but no more than three π-bonds. Optionally, the cation is bound to a weakly coordinating neutral donating ligand by not more than two π-bonds. This complex cation most preferably consists essentially of (i) a single allyl ligand, or, a canonical form thereof, which provides a σ-bond and a π-bond; or, (ii) a compound providing an olefinic π-bond to the metal, and a σ-bond to the metal from a distal C-atom, spaced apart from either olefinic C-atom by at least two carbon-carbon single bonds. The weakly coordinating neutral ligand is preferably a chelating bidentate cyclo($C_6$–$C_{12}$)diolefin, for example cyclooctadiene ("COD"). If a Group VIII metal hydride complex with a weakly coordinating neutral ligand can be formed, the bonds will be π-bonds.

Embodiment (i) of the complex cation is illustrated by:

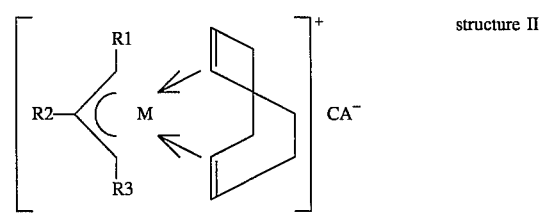

structure II

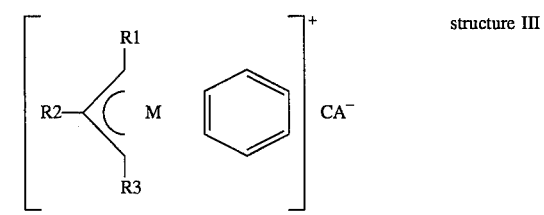

structure III where $R^1$, $R^2$, $R^3$ are each independently a hydrogen atom, or a hydrocarbyl group containing from 1 to 8 carbon atoms. Optionally, any two of $R^1$, $R^2$, $R^3$ may be linked together to form a cyclic ring structure.

Embodiment (ii) of the complex cation is illustrated by:

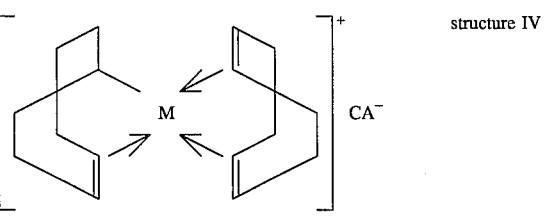

structure IV

The weakly coordinating neutral bidentate ligand may be linked to the allyl moiety, or a canonical form thereof, by a carbon chain, as illustrated by

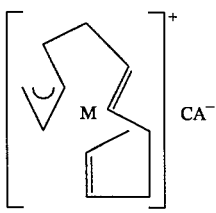

structure V

It is a specific object of this invention to provide the above-described complex cation of "M" with a weakly coordinating or non-coordinating counteranion which is a relatively inert and poor nucleophile, which provides the cation with essential solubility in non-aggressive solvents such as toluene, xylene, and 1,2-dichloroethane. The anion is preferably selected from the group consisting of a tetrafluoride of Ga, Al, and B, or a hexafluoride of P, Sb and As, and a phenyl borate in which the phenyl ring has F or $CF_3$ substituents.

It is a general object of this invention to make a NB-type addition homo- or copolymer having chains with a single terminal hydrocarbyl group derived from a chain transfer agent ("CTA") containing an olefinic non-styrenic double bond, without the hydrocarbyl group being introduced in a chain except near the end thereof, the chains having a controllable mol wt $M_w$ in a preselected range from 20,000 to 500,000, formed with one or more NB-type monomers, each having a NB repeating unit chosen from (i) an unsubstituted NB or NB-type monomer including norbornadiene; (ii) NB substituted with a $(C_1-C_{20})$alkyl, $(C_1-C_{20})$haloalkyl, $(C_5-C_{12})$cycloalkyl which, in turn, may be substituted; or, (iii) $(C_1-C_6)$alkylidene group; or, (iv) an aryl or haloaryl group, e.g. phenylNB, p-chlorostyrylNB; or, a $(C_7-C_{15})$aralkyl or haloaralkyl group, e.g. 5-benzylNB; or (v) $(C_3-C_{20})$alkenylyl; or (vi) $(C_4-C_{20})$alkylene provided it does not terminate with a vinyl group, that is, the double bond in the substituent is an internal olefinic bond. The repeating unit may be derived from any NB-type monomer, including 5,8-dimethano-1,2,3,4,4a,5,8,8a-octahydronaphthalene, tetracyclododecene ("TD"), in which there may be one or more of the aforementioned substituents, or DCPD. When the repeating unit is derived from NB, one substituent may be in the 5- (or 6-) positions of the NB structure; if derived from TD, one substituent may be in the 6- or 7- positions of the TD structure.

The substituted-NB monomer may be prepared by a Diels-Alder reaction with cyclopentadiene ("CPD") and the appropriate olefin. Carrying out the reaction with more CPD will produce TD with the same sidechain substituent. The homo- or copolymer of the NB-type monomer is formed in a desired mol wt range by using a predetermined amount of the CTA having an olefinic double bond, in the absence of an alkyl aluminoxane. The amount of CTA used is a function of the mol wt chosen for the polymer, irrespective of which addition polymerization catalyst is used, provided the catalyst yields only an addition polymer terminated with the chain transfer agent as a chain end in which the olefinic double bond is preserved.

The effectiveness of the Group VIII metals, particularly Ni and Pd, is unique in our addition polymerization process. In a two-component system, with MAO as co-catalyst, and in which transition metals such as Mn and Mo are used to form organometal catalysts, a ROMP polymer is predominantly formed.

However, controlling the mol wt range of polymer by the use of the monoolefin CTA is also effective in the addition homo- or copolymer of a NB-type monomer, using a transition metal organometal complex in the presence of a sufficient amount of an alkylaluminoxane cocatalyst for the purpose at hand. The transition metal may be selected from Groups VB, VIB, VIIB, or VIII of the Periodic Table, and preferably chromium, molybdenum, tungsten, manganese, nickel, palladium and platinum. A desired mol wt of polymer may be made having a range less than one order of magnitude.

In an effective addition polymerization process in which at least 80% of the monomers are converted to polymer, the mol wt of polymer made may be controlled within one order of magnitude. For example, to make a polymer having a $M_w$ of about 200,000, by using a calculated amount of ethylene to give that mol wt, the polymer formed would typically be in the range from 100,000 to 300,000.

It is another specific object of this invention to provide a homopolymer of NB, or a NB-type monomer, and a copolymer thereof, the homo- and copolymer each, having a controlled mol wt in a predetermined range within less than one order of magnitude, wherein the monomer has a single $(C_6-C_{16})$alkyl or $(C_6-C_{12})$haloalkyl, or ethylidene substituent, and the length of the substituent on at least one of the monomers is chosen to provide a copolymer of desired $T_g$.

It is still another specific object of this invention to provide a copolymer of NB-type monomers, at least one of which is a NB-type monomer having a single alkylene substituent having from 2 to 20 carbon atoms, in which copolymer the length of the substituent on at least one of the monomers and the ratio of the comonomers is so chosen as to provide a copolymer of desired $T_g$.

It is yet another object of this invention to provide a copolymer of a first monomer selected from the group consisting of NB and substituted NB present in a major amount relative to a second monomer chosen from a mono$(C_4-C_8)$cycloolefin; norbornadiene; trimer of cyclopentadiene, and a multi-ringed cyclomonoolefin structure derived from at least one NB unit, the structure including up to four fused rings; and, the CTA is present in an amount less than 10 mole %, preferably less than 5 mole %, relative to the first monomer.

It is a further specific object to enhance the yield of the addition polymer formed as stated above, irrespective of whether the polymerization is carried out in the absence or presence of a lower $(C_1-C_3)$alkylaluminoxane cocatalyst, by the simple expedient of using a polar hydrocarbyl solvent rather than a non-polar solvent, without regard to the transition metal used to form the organometal complex. In particular, when the organometal complex catalyst in combination with an alkylaluminoxane co-catalyst in an amount effective to convert at least one NB-type monomer with another NB-type or cyclic monomer polymerizable with NB, into an addition polymer, and the metal is selected from the group consisting of chromium, molybdenum, tungsten, manganese, nickel, palladium and platinum, it is found that with the polar hydrocarbyl solvent the conversion of monomer(s) to polymer is at least 100% higher than when said reactants are polymerized in an essentially non-polar solvent. The amount of aluminoxane used is preferably from 50 to 500 equivalent of Al for each equivalent of transition metal in the catalyst.

BRIEF DESCRIPTION OF THE DRAWING

The foregoing and additional objects and advantages of the invention will best be understood by reference to the following detailed description, accompanied with schematic illustrations of preferred embodiments of the invention, in which illustrations like reference numerals refer to like elements, and in which.

DETAILED DESCRIPTION OF THE INVENTION

In the description below, reference to the "π-allyl complex" refers equally to a canonical form thereof. The bidentate ligand in the complex M cation is labile and easily displaced from the π-allyl complex. Upon displacement by a NB-type moiety providing a ligand, an insertion reaction occurs which results in an unexpectedly facile addition polymerization. This displacement and subsequent addition reaction occurs only when a NB-type monomer is in the liquid phase, and the monomer is used in a much larger molar amount than the diolefin in the Ni-complex, typically in a molar excess of at least 1000:1. Despite the known stability of a bidentate ligand when bonded to "M", an insertion reaction of the monomer in the π-allyl complex results in the formation of a unique cationic transition metal propagating species.

Without an aliphatic or cycloaliphatic olefin donor, such as a monoolefinically unsaturated chain transfer agent in an appropriate amount, chosen to provide polymer chains of desired average length, the propagating species results in a cycloolefin addition polymer having essentially no measurable unsaturation but an undesirably high mol wt. Besides the unique structure of the propagating species consisting of the "M-complex" in which a propagating monomer moiety is inserted, the species forms a polymer in which both, its mol wt, and therefore, its glass transition temperature $T_g$, are tailored to provide a weight average mol wt $M_w$ >50,000 but preferably not greater than about 500,000. Lower mol wt polymers with $M_w$ in the range from about 20,000 to 50,000, and oligomers with $M_w$ in the range from about 500 to 20,000, may also be formed by carrying out the polymerization in the presence of a progressively larger amount of olefin CTA.

Figure 1:
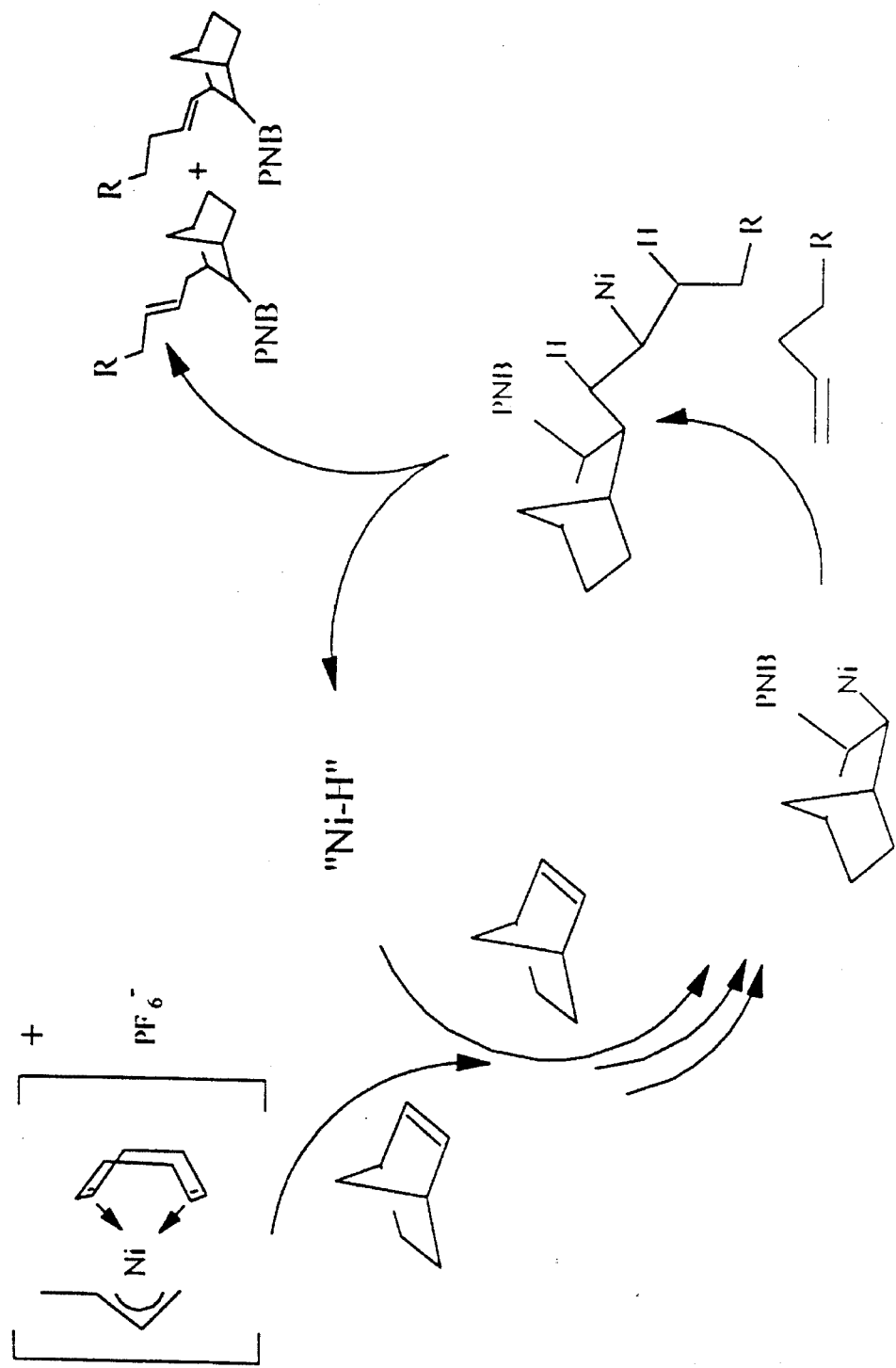
FIG. 1 is a schematic illustration depicting the manner in which the catalyst of this invention (Ni is illustrated) is believed to produce the copolymer.

Referring to FIG. 1, there is schematically illustrated the manner in which an olefin is believed to function as an efficient CTA in the coordination polymerization, in a manner analogous to that in which chain transfer occurs via β-hydride elimination in a transition-metal-catalyzed vinyl-type polymerization (e.g. of polyethylene or polypropylene). This mechanism proceeds via a growing poly(NB) chain which contains two β-hydrides, neither of which can be eliminated since one is located at a bridgehead and the other is situated "trans" to the metal. The result is that, in the absence of a CTA, the molecular weight of the poly(NB) formed typically runs into the millions.

However, as soon as an α-olefin (in FIG. 1, 1-decene is illustrated, for which R=$C_6H_{13}$) inserts, the resulting metal alkyl can undergo β-hydride elimination, generating an olefin-terminated poly(NB) chain, and, a nickel hydride species in which a NB molecule inserts to initiate the next poly(NB) chain. The overall effect is a highly effective chain transfer process.

Figure 2:
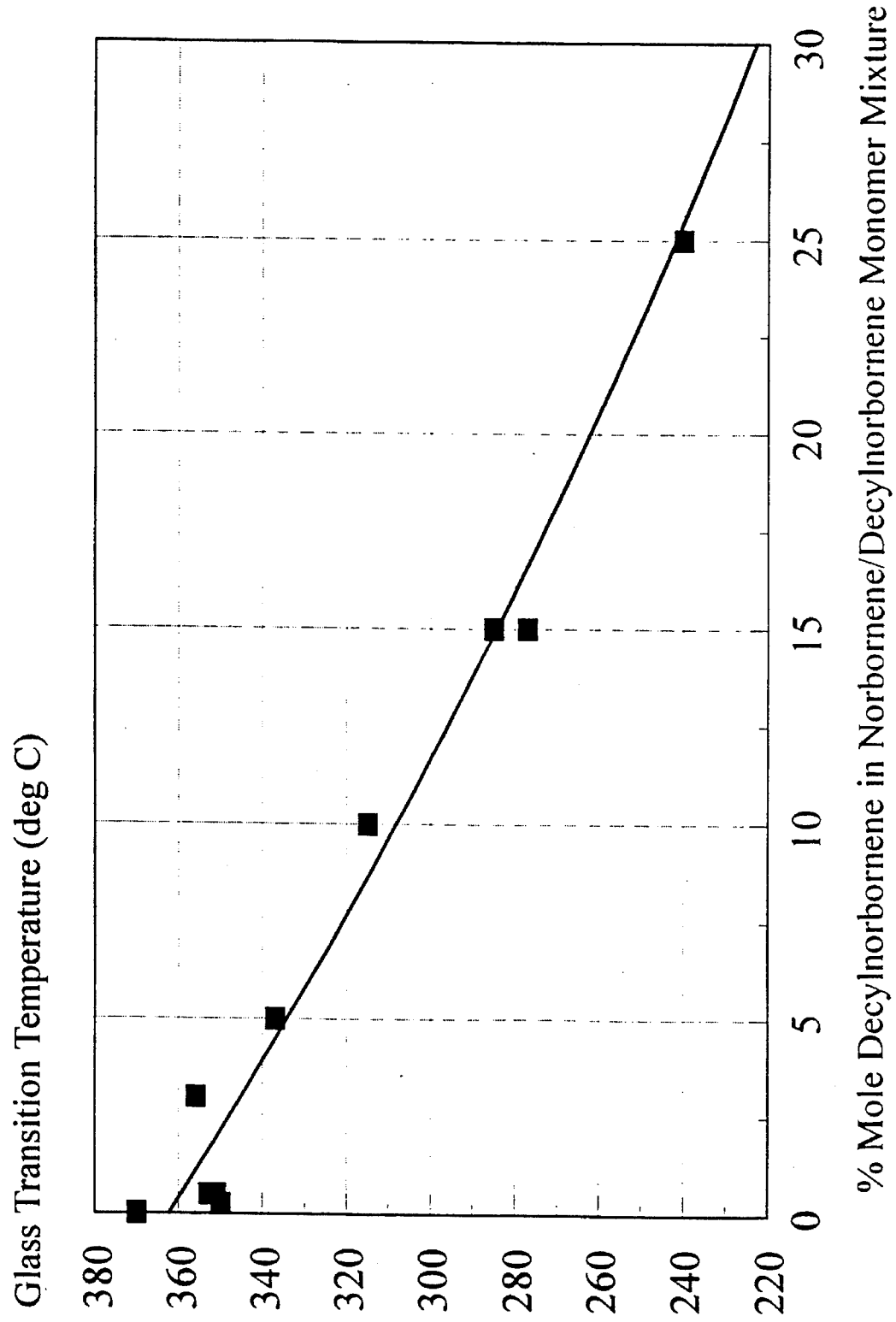
FIG. 2 is a graph depicting the effect of the concentration of 5-decylnorbornene on the Tg of a copolymer of norbornene and 5-decylnorbornene.

Referring to FIG. 2, it is evident that the $T_g$ of the copolymer formed is a function of the concentration of the 5-decylNB in the mixture of monomers, the greater the concentration of 5-decylNB, the lower the $T_g$ of the copolymer.

Figure 3:
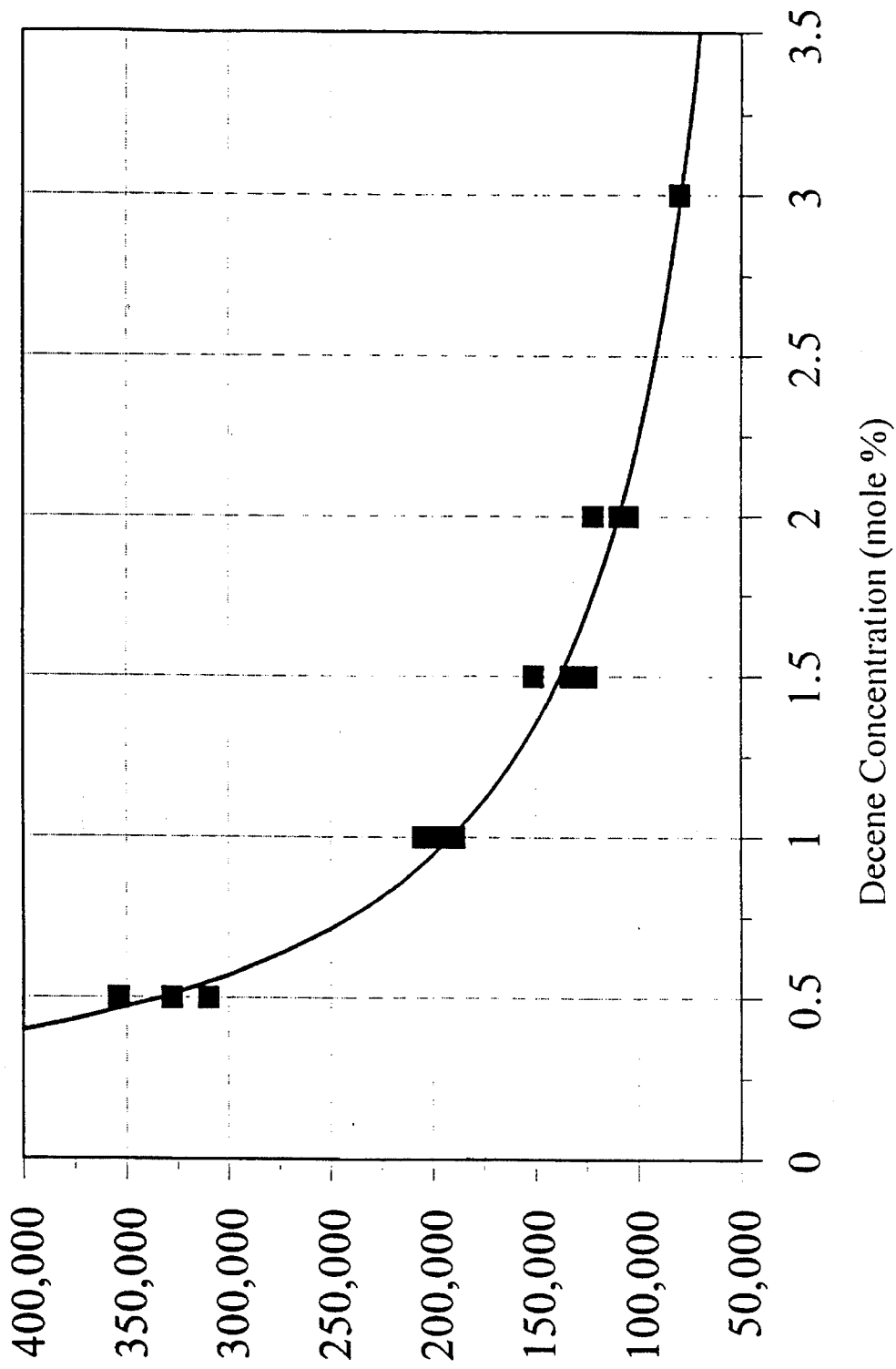
FIG. 3 is a graph depicting the effect of 1-decene concentration on the weight average molecular weight of poly(norbornene) formed.

Referring now to FIG. 3, the efficacy of the α-olefin as a CTA is evidenced by the relatively low concentration <10 mole %, typically from 0.25–5 mole %, of α-olefin necessary to provide the desired molecular weight. Relying on the mechanism illustrated, a calculated amount of olefin affords a polymer of desired molecular weight which is reproducibly tailored for a particular purpose. Without the knowledge that the α-olefin would function as described, such an accurately tailored coordination addition polymer of cycloolefins could not have been reproducibly produced by modifying any known prior art process.

In one specific embodiment where M represents Ni, the organometallic Ni cation has a formal coordination number of 4 but an oxidation state of 2. The surprising effect of the anion which is both relatively inert, and a relatively poor nucleophile, not only accounts for the solubility of the Ni-complex in halocarbons (e.g. 1,2-dichloroethane) and aromatic solvents (e.g. toluene and xylene), but also appears to favor the rapid displacement of the bidentate ligand and formation of an addition polymer in a chosen, desirable relatively narrow mol wt range, e.g. from 200,000 to 300,000.

The '755A reference taught that the active catalyst species is generated from a two-component system, wherein (i) the transition metal component is present in combination with (ii) an alkylaluminoxane cocatalyst.

In contrast with the deficiencies of known catalyst systems heretofore suggested for use in the polymerization of cycloolefins, the novel catalyst of this invention (1) requires no cocatalyst, and (2) is not subject to activation equilibrium, hence defies deactivation under normal use.

The key to proper anion design requires that the anionic complex be soluble in a non-aggressive solvent, labile and stable toward reactions with the cationic metal complex in the final catalyst species. The anions which are stable toward reactions with water or Bronsted acids, and which do not have acidic protons located on the exterior of the anion (i.e. anionic complexes which do not react with strong acids or bases) possess the stability necessary to qualify as a stable anion for the catalyst system. The properties of the anion which are important for maximum lability include overall size, and shape (i.e. large radius of curvature), and nucleophilicity.

In general, a suitable anion may be any stable anion which allows the catalyst to be dissolved in a solvent of choice, and has the following attributes: (1) the anion should form stable salts with the aforementioned Lewis acid, Bronsted acids, reducible Lewis Acids, protonated Lewis bases, and silver cations; (2) the negative charge on the anion should be delocalized over the framework of the anion or be localized within the core of the anion; (3) the anion should be a relatively poor nucleophile; and (4) the anion should not be a powerful reducing or oxidizing agent.

Examples of anions meeting the foregoing criteria are the following: $BF_4^-$; $PF_6^-$; $AlF_3O_3SCF_3^-$; $SbF_6^-$; and $B[C_6H_3(CF_3)_2]_4^-$ A preferred pre-formed, single catalytic component is formed by protonating a known tris- or tetrakisolefinnickel compound (see P. W. Jolly and G. Wilke, Vol I supra, pgs 252 and 338) and this protonated compound does not have to be separated from solution before being added to NB-type monomer(s) to be polymerized. A convenient proton source to convert the trisolefinnickel is N,N-dimethylanilinium tetrakis(bis-3,5-trifluoromethyl)phenylborate. The precursor is most preferably chosen from (i) (t,t,t-1,5,9-cyclododecatriene)nickel or bis(cyclooctadiene)nickel; and, (ii) the reaction product of one of the foregoing with butadiene, which reaction products are represented by structure below:

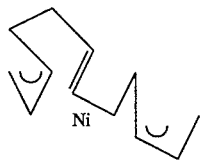

To obtain better than 70% conversion, it is essential that a single component catalyst be formed after protonation because, if used in separate solutions, the non-protonated nickel complex and the protonating agent fail to convert even 10% of the monomers to polymer.

Most surprising is that unlike in most known polymerizations of NB-type monomers where a Group VIII organometal complex is effective, as for example in the Maezawa et al '755A and the Okamoto et al 418A1 disclosures, testing on a bench scale has revealed that only Ni and Pd produce yields which may be deemed practical, and of these two, only Ni controllably and rapidly produces polymer in the desired critical range of one order of magnitude, starting with 20,000 and not more than 50,000 so that the upper limit of the starting range is 200,000 and that of the last is 500,000. In a typical such polymerization with a preferred Ni complex, the polymerization reaction is completed in less than 20 min.; in contrast, with a preferred Pd complex, the reaction takes about 1 hr or more.

The most preferred active species containing Ni is a pre-formed, single catalytic component consisting of the combination of the π-allyl-Ni-diolefin cation, for example, the π-allyl-Ni-cyclo-1,5-octadiene cation, referred to as a "[allyl-Ni-COD]+complex", with a compatible weakly coordinating counteranion for the complex. There is no cocatalyst required and none is used.

The catalyst may be prepared by any known synthesis which results in combining a [π-($C_6$–$C_{12}$)cycloalkadienyl]M complex containing two ligands each of which react with an acidic hydrogen atom (i.e., proton); and, a salt which will provide both, solubility in a commercially easily available and environmentally acceptable solvent, as well as a compatible weakly coordinating counteranion for the complex which provides the cation.

In this combination, it is preferred to use an anion of a Group IIIA tetrafluoride, e.g. $BF_4^-$; or a Group VA hexafluoride, e.g. $PF_6^-$ anion; or a phenylborate having plural trifluoro ring substitutions; or an arylborate having plural fluoromethyl substituents. Such anions provide desired solubility and are compatible with and noncoordinating toward the Ni-complex cation formed. Yet such anions effectively stabilize the cation without adversely affecting its ability to polymerize NB-type monomers.

This complex cation is believed to donate a proton which will irreversibly combine with the ligands (substituents) generated by "M" and the anion.

The specific catalyst: Ni-COD/weakly coordinating anion is pre-formed by first forming a neutral Ni[COD]$_2$ complex, reacting the complex with an allylbromide to generate a bis(allylNi bromide) complex which is then subjected to scission with a halide abstracting agent and an anion-providing salt such as thallium phosphorushexafluoride. The sequence is written as follows:

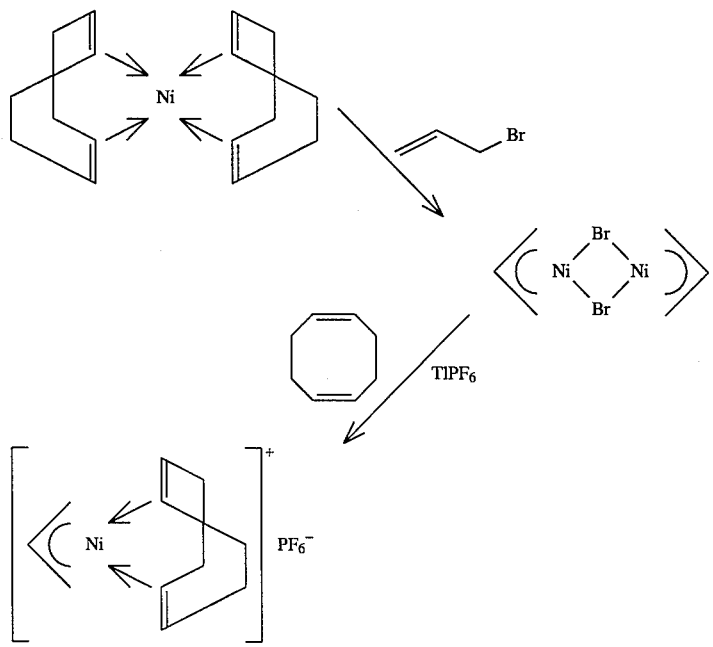

When partitioned, only one COD ligand remains, and it is bonded through two π bonds to the nickel.

In the following illustrative examples, various complex catalysts are prepared and used as illustrative examples in the preparation of homopolymers of NB and substituted NB monomers, and of copolymers thereof.

Examples of Pre-formed Single Component Catalysts

Catalyst A: [(η³-crotyl)(cycloocta-1,5-diene)nickel] hexafluorophosphate

To a flask containing bis(cycloocta-1,5-diene)nickel (2.75 g, 10 mmol), was added a solution of crotyl bromide (1.35 g, 10 mmol) and butadiene (2.5 g) in toluene (24 ml). A deep-red solution of (crotyl)nickelbromide dimer resulted. After 2 hours at ambient temperature the solvent was removed under reduced pressure. To the resulting powder was added a solution of 1,5-cyclooctadiene (3.6 ml) in tetrahydrofuran (THF) (32 ml). After cooling to 0° C. thallium hexafluorophosphate (3.5 g, 10 mmol) was added and the resulting mixture allowed to warm to ambient temperature (21° C.) and be stirred for one hour.

The solvent was stripped away under reduced pressure and dichloromethane (24 ml) was added. Insoluble thallium bromide was removed by filtration (under nitrogen) to afford the complex catalyst product as a solution in dichloromethane. This solution was reduced in volume and diethylether was added. The catalyst was washed thoroughly with diethylether, then dried under reduced pressure, to afford the catalyst as 1.3 g of orange crystals. This catalyst, identified hereafter as "catalyst A" is referred to as [(η³-crotyl)(cycloocta-1,5-diene)nickel]hexafluorophosphate.

Catalyst B: Tetrakis(acetonitrile)palladium (II) tetrafluoroborate Purchased from Aldrich Chemical Company, used as received.

Catalyst C: [(η³-crotyl)(cycloocta-1,5-diene)nickel]tetrakis(3,5-bis(trifluoromethyl)-phenyl)borate 3,5-bis(trifluoromethyl)bromobenzene (50 g, 170 mmol) in diethylether (150 ml) was added slowly (over about 2 hours) to magnesium powder (5.1 g, 210 mmol) followed by refluxing for about 3 hours to give a dark grey solution. Sodium tetrafluoroborate (3.4 g, 30 mmol) was added and the resulting slurry was refluxed for 24 hours. The refluxed slurry was added to an aqueous solution of sodium carbonate (75 g in 1 liter), stirred 20 minutes, then filtered. The aqueous layer was separated and extracted 4 times with diethylether (200 ml aliquots). The ether layers were combined and dried over sodium sulfate and treated with decolorizing charcoal. The solvent was removed under high vacuum to afford an amber slush. Methylene chloride was added until the solid was thoroughly wetted, then chloroform was added and the resulting solid was filtered and dried. An essentially quantitative yield of recovered sodium tetrakis[3,5-bis(trifluoromethyl)phenyl]borate (18 g), was in the form of a light tan, crystalline solid.

COD (1.3 ml) in THF (16 ml) was added to crotylnickel bromide dimer (0.5 g, 1.75 mmol). The mixture was cooled to 0° C. and the above described sodium tetrakis[bis(trifluoromethyl)phenyl]borate (3.1 g, 3.5 mmol) was added. The mixture was warmed to room temperature and stirred for 1 hour to give a clear, dark brown solution. The solvent was removed under vacuum and methylene chloride added to give a slightly hazy solution. The solution was filtered to give a clear, amber solution. The solvent was removed under vacuum, washed three times with hexane, filtered and dried under high vacuum to afford the product, [(η³-crotyl)-(cycloocta-1,5-diene)nickel]tetrakis(3,5-bis(trifluoromethyl)phenyl)borate (3.42 g) as a pale yellow powder.

Catalyst D: [6-methoxynorbornen-2-yl-5-palladium(cyclooctadiene)]hexafluorophosphate To a flask containing (norbornadiene)palladium dichloride (1.0 g. 3.7 mmol) and methanol (20 ml) was added a solution of potassium methoxide (0.256 g, 3.65 mmol) in methanol (20 ml), the addition being made at −78° C. After an hour at that temperature the mixture was allowed to warm to ambient temperature and was filtered and dried to afford a light green-brown solid (methoxynorbornenylpalladium-chloride dimer). A portion of this material (0.5 g, 1.65 mmol) was placed in a stirred flask with THF (50 ml) and COD (2 ml). Then a solution of thallium hexafluorophosphate (0.57 g, 1.65 mmol) in tetrahydrofuran (17 ml) was added 0° C. After warming to room temperature the solvent was removed and then 1,2-dichloroethane (60 ml) was added to give a yellow solution and a pale colored precipitate (thallium chloride). The solution was filtered and the solvent removed under high vacuum to afford the product, identified hereafter as catalyst D, and referred to as methoxynorborneylpalladium(cyclooctadiene)]hexafluorophosphate (structure below) as a greenish solid.

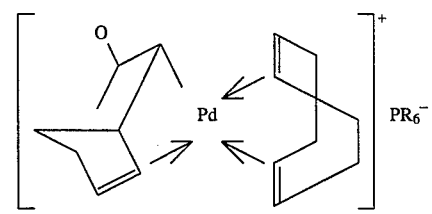

Catalyst E: [(η³-crotyl)(cycloocta-1,5-diene)palladium] hexafluorophosphate

To a 500 ml Ehrlenmeyer flask was added sodium chloride (2.95 g, 50.4 mmol), palladium dichloride (4.44 g, 25.3 mmol), methanol (150 ml) and water (2.25 g, 125 mmol). The resulting suspension was stirred at ambient temperature for an hour affording a dark-brown solution. To this solution was added crotyl bromide (7.6 ml, 74 mmol).

The vessel was then purged with carbon monoxide for 30 minutes (at a rate of 40 ml per minute). After several minutes the solution became lighter in color with a noticeable amount of a precipitate. The mixture was then poured into water (1 liter) affording an amber-brown colored solid. The mixture was extracted with 3 aliquots of chloroform (total volume 500 ml). removal of the chloroform from the resulting solution afforded a yellow green solid which was characterized by proton NMR methods as (η³-crotyl)palladium halide dimer. The yield was essentially quantitative. This yellow-green solid was dissolved in tetrahydrofuran (100 ml) and 1,5-cyclooctadiene (8.7 ml) was added. Thereafter thallium hexafluorophosphate (8.8 g, 25.3 mmol) was dissolved in THF and both solutions were cooled to 0° C. The thallium hexafluorophosphate solution was added slowly to the solution of the palladium compound. An immediate off-white precipitate was observed, the amount of which increased as more of the thallium solution was added.

After the addition was completed the ice-bath was removed and the suspension was allowed to warm to ambient temperature, with stirring. The THF was removed under vacuum and dichloromethane (100 ml) was added. The mixture was filtered and the solution was concentrated to a volume of about 40 ml. To this solution was added diethylether (100 ml) which resulted in the formation of light yellow-white crystals in high yield. The crystals are identified hereafter as catalyst E, and referred to as [(η³-crotyl-)(cycloocta-1,5-diene)palladium]hexafluorophosphate. The material was characterized by NMR spectroscopic methods.

Example of a two-component catalyst with MAO co-catalyst

Catalyst F: nickelethylhexanoate: first component, and MAO second component. Nickelethylhexanoate, identified hereafter as Catalyst F, is obtained as a solution in mineral spirits and was used, as received (from OMG Inc.) in combination with MAO as cocatalyst.

Additional Examples: Pre-formed Single Component Catalysts

Catalyst G: $\eta^3$, $\eta^2$, $\eta^2$-dodeca-2(E),6(E),10(Z)-triene-1-ylnickel hexafluorophosphate The synthesis of this catalyst, the structure of which is represented below, is described by R. Taube et at., Makromol. Chem., Macromol. Symp., 66, (1993) 245–260 and in references cited in Taube et al.

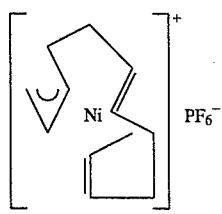

Catalyst H: Tetrakis(octanonitrile)palladium (II) tetrafluoroborate

Heptylcyanide (octanonitrile) (40 ml) was added to tetrakis(acetonitrile)palladium (II) tetrafluoroborate (1.5 g) and the resulting slurry was allowed to stir for 4 hours, after which time the solid had dissolved, affording a red solution. Hexane (60 ml) was added and then the hexane and excess nitriles were removed under high vacuum, with the flask being heated on a steam bath, to afford the catalyst product (which was washed 3 times with hexane and redried), as a red, viscous oil identified as [tetrakis(octanonitrile)-palladium (II)tetrafluoroborate].

Catalyst I: [($\eta^3$-cyclooctenyl)(cycloocta-1,5-diene)nickel] tetrakis(3,5-bis(trifluoromethyl)-phenyl) borate in toluene To a mixture of bis(cyclooctadiene)nickel (0.011 g, 0.04 mmol) and N,N-dimethylanilinium-3,5-bis(trifluoromethyl)-phenyl)borate (0.046 g, 0.047 mmol), was added toluene (2 ml). This resulted in an orange solution of the catalyst which was used without isolating it.

Catalyst J: {CH$_3$Ni(C$_2$H$_4$)$_2$}$^-$Li{(CH$_3$)$_2$NCH$_2$CH$_2$N(CH$_3$)$_2$}$_2^+$, an anionic catalyst.

This compound was made according to a method taught by Klaus Jonas et al Agnew. Chem. Int. Ed. Engl., 15 621–2 (1976).

Catalyst K: Bis($\eta^3$-allyl nickel trifluoroacetate)

This compound was made according to a method taught by F. Dawans et al J. Organometal. Chem., 21 259–61 (1970).

Catalyst L: $\eta^3$, $\eta^2$, $\eta^2$-dodeca-2(E),6(E),10(Z)-triene-1-ylnickel on a support, forming an active support.

The synthesis of this catalyst is described by R. Taube et al., Makromol. Chem., 194, (1993) 1273–88 and references therein. The active support, AlF$_3$, was prepared by reacting BF$_3$.etherate with triethylaluminum and isolating the product as a white solid. This support was reacted with [Ni(C$_{12}$H$_{19}$)]O$_3$SCF$_3$ at ambient temperature in toluene for 24 hours. The slurry/solution of the nickel compound was originally yellow in color but became colorless as the reaction proceeded, affording the supported catalyst as a yellow-brown solid which was filtered and dried. The catalyst (L) was stored, under nitrogen as a yellow-brown powder.

Catalyst M: $\eta^3$-crotyl(cycloocta-1,5-diene)nickel on an active support

Catalyst A (5 mg) was dissolved in 1,2-dichloroethane (20 ml) and added to an active support (200 mg) (obtained from Witco and used as received) consisting essentially of an alkylaluminoxane (MAO) on a silica support. The active support contained 7.4% by wt aluminum. The resulting mixture was stirred at ambient temperature for 5 minutes and then used, without isolating, as a supported catalyst.

Catalyst N: Manganese Lin-All

This material, manganese Lin-All (a long chain manganese carboxylate salt), was obtained as a solution in mineral spirits (containing 6% w Mn) from OMG Inc., and was used as received in combination with MAO as cocatalyst.

Catalyst O: Molybdenum Hex-Cem

This material, molybdenum Hex-Cem (a long chain molybdenum carboxylate salt), was obtained as a solution in mineral spirits (containing 15% by wt Mo) from OMG Inc., and was used as received in combination with MAO as cocatalyst.

EXAMPLE 1

Catalyst A with decylnorbornene comonomer and decene-1 as Chain Transfer Agent "CTA"

To a 3-liter wide-mouth glass flask equipped with a mechanical stirrer were added the following materials in the given order: norbornene (163 g, 1.73 mol), 1,2-dichloroethane (2,950 g, 2,341 ml), 5-decylnorbornene (71.7 g, 0.31 mol), 1-decene (3.57 g, 4.8 ml, 0.0255 mol) and then catalyst A (0.187 g, 0.51 mmol) dissolved in dichloromethane (2 ml). Immediately after adding the catalyst to the stirred solution polymer started forming and the reaction exothermed to 44° C. The mixture was allowed to stir for a total of 60 minutes before methanol (100 ml) was added to destroy the catalyst. The polymer cake was added to stirring methanol to afford the product as a white powder which was filtered off and washed with methanol and then ethanol. The polymer was then dried, dissolved in cyclohexane (4 liter) and then precipitated by addition to acetone. The polymer obtained was filtered off, washed with acetone and dried under vacuum for 16 hours at 150° C. The resulting polymer weighed 188 g (80% isolated yield), showed a $T_g$ of 282° C. and molecular weight (relative to polystyrene standard) of 167,000 ($M_w$) as determined by GPC methods ($M_n$ was 79,400). In addition to the reduction in molecular weight, the 1-decene caused the polymer to be terminated with an olefinic group observed by proton NMR spectroscopy. Resonances are observed at 5.35 ppm relative to tetramethylsilane using a solution in perdeuterated o-dichlorobenzene at 110° C. The 5.35 ppm corresponds to two overlapping protons of a 1,2-disubstituted double bond.

EXAMPLE 2

Catalyst A with decylnorbornene comonomer but no $\alpha$-olefin or other CTA

In this example no olefin was used to control molecular weight. To a 3-liter wide-mouth glass flask equipped with a mechanical mechanical stirrer was added the following materials in the given order: norbornene (123 g, 1.3 mol), 1,2-dichloroethane (2,500 g, 2,006 ml), 5-decylnorbornene (53.1 g, 0.23 mol), and then catalyst A (0.119 g, 0.325 mmol) dissolved in dichloromethane (2 ml). Immediately after adding the catalyst to the stirred solution polymer started forming and the reaction exothermed. The mixture was allowed to stir for a total of 60 minutes before methanol (100 ml) was added to destroy the catalyst. The polymer cake was added to stirring methanol to afford the product as a white powder which was filtered off and washed with methanol and then dried under vacuum for 16 hours at 60° C. followed by several hours at 180° C. The resulting polymer showed a molecular weight of 1,460,000 ($M_w$) as determined by GPC methods ($M_n$ was 366,000). The polymer showed no resonances in the olefinic region in the NMR spectrum.

EXAMPLE 3

Catalyst A with NB but no Mw control and no comonomer

To a 3-liter wide-mouth glass flask equipped with a mechanical stirrer was added the following materials in the given order: norbornene (230 g, 2.4 mol), 1,2-dichloroethane (2,950 g, 2,341 ml) and then catalyst A (0.44 g, 1.2 mmol) dissolved in dichloromethane (2 ml). Immediately after adding the catalyst to the stirred solution polymer started forming and precipitating from solution as a white powder to give a viscous white "cake" within about 5 seconds. The reactor exothermed to a maximum of 64° C. The mixture was allowed to stand for a total of 60 minutes before methanol (100 ml) was added to destroy the catalyst. The polymer cake was added to stirring acetone to afford the product as a white powder which was filtered off and washed with acetone and then methanol. The polymer was then dried overnight in a heated (60° C.) vacuum oven. The resulting poly(norbornene) weighed 228.6 g (99.4% isolated yield), showed a $T_g$ of 370° C. and molecular weight of 1,640,000 ($M_w$) as determined by GPC methods ($M_n$ was 436,000).

The addition homopolymer of NB exhibited a Tg at 370° C. (nominally). Though prone to oxidation in air at 370° C. there is no melt flow. Specifically, a shear stress of 0.76 MPa was insufficient to induce any flow prior to decomposition. An even higher temperature, typically 50° C. above the Tg is required to obtain melt flow necessary for fusion, that is, to progress from the elastic plateau into the terminal flow regime. Decomposition is unavoidable when such melt flow is obtained. The conclusion is that the homopolymer of NB is not processable in the melt state.

EXAMPLES 4–13

Catalyst A with different levels of decylnorbornene (comonomer) and decene-1 (CTA)

The following examples demonstrate the effects of an α-olefin and a 5-alkylnorbornene comonomer on polymer glass transition temperature and molecular weight. All the polymerizations were run, in a 50 ml glass vial, at ambient temperature in 1,2-dichloroethane (25 ml) using a magnetic stir bar for agitation. The components were added in the following order: norbornenes, decene-1, 1,2-dichloroethane, catalyst A (2.2 mg, 0.006 mmol dissolved in 0.5 ml 1,2-dichloroethane). In experiments 12 and 13, 4.4 mg (0.012 mmol) of catalyst A was used. In example 7 the NB was used as received without any purification or drying. The reactions were run for 1 hour (experiment 13, 30 minutes) after which methanol was injected to terminate the reaction and the polymer was washed with excess methanol and dried. The results are set forth in the following Table 1.

It is seen from the effect of increasing 1-decylNB concentration, that by copolymerizing the NB with decylNB, the Tg of the copolymer formed can be manipulated. A copolymer with 20 mole % 1-decylNB exhibits a Tg of about 250° C. Flow is initiated for this copolymer with a shear stress of 0.76 MPa at 310° C. The viscosity can be adjusted between 800,000 and 50,000 poise by changing temperatures between 310° C. and 340° C., which is suitable for processing. A negligible amount of oxidation and chain scission occurs during the short time required to process the polymer at these temperatures so that the properties of the polymer, after melt flow, are retained. Thus copolymerization with a substituted-NB of choice one can lower the Tg sufficiently to allow melt processing at a desired temperature.

TABLE 1

| Ex. # | Norbornene (g, mmol) | Decene-1, (g, mmol) | 5-Decyl-norbornene, (g, mmol) | Polymer yield, (g) | Conv'n (%) | $M_w \times 10^3$ | $M_n \times 10^3$ | $T_g$, °C. |
|---|---|---|---|---|---|---|---|---|
| 4 | 2.32, 24.6 | 0.035, 0.25 | 0.03, 0.125 | 2.16 | 92 | 195 | 80 | 353 |
| 5 | 2.31, 24.5 | 0.053, 0.38 | 0.03, 0.125 | 2.18 | 93 | 124 | 44 | 351 |
| 6 | 2.25, 23.9 | 0.053, 0.38 | 0.18, 0.75 | 2.19 | 90 | 125 | 54 | 356 |
| 7 | 1.98, 21.1 | 0.018, 0.125 | 0.88, 3.75 | 2.49 | 87 | 310 | 129 | 285 |
| 8 | 2.2, 23.3 | 0.07, 0.5 | 0.29, 1.25 | 2.35 | 94 | 114 | 44 | 336 |
| 9 | 2.08, 22.1 | 0.053, 0,38 | 0.59, 2.5 | 2.39 | 90 | 128 | 54 | 297 |
| 10 | 2.34, 24.8 | 0.018, 0.125 | 0.015, 0.063 | 2.26 | 96 | 331 | 117 | 375 |
| 11 | 1.95, 20.8 | 0.07, 0.5 | 0.88, 3.75 | 2.6 | 92 | 110 | 50 | 265 |
| 12 | 1.7, 18 | 0.84, 6 | 0, 0 | 1.7 | 100 | 11 | 6 | 274 |
| 13 | 2.3, 24.5 | 0, 0 | 0, 0 | 2 | 87 | 1250 | 335 | 370 |

Note that in each of the foregoing examples, the conversion obtained was substantially quantitative being generally above 90%. Further, when the molar ratio of 1-decene to NB is 0.33, a macromonomer of NB is formed which has a Mw of only 11,000 with 100% conversion.

EXAMPLES 14–16

Catalysts A and C, solution polymerizations with different solvents

In these three examples, catalysts A and C are used to polymerize NB under solution conditions. Each example was run in 25 ml of chlorobenzene, o-dichlorobenzene, and toluene (as indicated in Table 2 below) in a 50 ml glass vial, at ambient (22° C.) temperature (example 14 was at 60° C.) using a magnetic stir bar for agitation. The components were added in the following order: norbornene (2.29 g, 24.4 mmol, used as received with no further purification), chosen solvent, catalyst A (2.2 mg, 0.006 mmol dissolved in 0.5 ml of the solvent), experiment 14 catalyst C (6.6 mg, 0.006 mmol). Each reaction was run for 1 hour to produce a viscous solution ('polymer cement') into which methanol was injected to terminate the reaction. The polymer was then washed with excess methanol and dried.

TABLE 2

| Expt # | Temp. °C. | Catalyst | Solvent | Polymer yield, g | Conv'n, % |
|---|---|---|---|---|---|
| 14 | room | A | chlorobenzene | 2.05 | 89 |
| 15 | room | A | o-dichlorobenzene | 2.2 | 96 |
| 16 | 60 | C | toluene | 0.89 | 39 |

EXAMPLES 17,18

Sen/Risse (catalyst B) using an α-olefin for Mw control

In one (#17) of these two examples, the polymerization carried out by Sen and Risse, using a palladium catalyst and no CTA, is substantially duplicated. For comparison, the only difference in #18 is that 10 mol % 1-decene is added to a mixture analogous to the one which produced the homopolymer in #17. Each polymerization was run in a 50 ml glass vial, at ambient temperature with nitromethane (10 ml) as solvent, using a magnetic stir bar for agitation. The components in #18 were added in the following order: norbornene (5 g, 53.1 mmol), nitromethane, catalyst B (11 mg, 0.026 mmol which was first dissolved in 2 ml of nitromethane) then decene-1 (1.0 ml, 5.2 mmol). In #17, the same procedure just described was followed, but no 1-decene was used. Each reaction was allowed to proceed for 1 hr to allow a comfortable margin for completion. Methanol was then injected into the solid reaction mass to terminate the reaction. The polymer was washed with excess methanol and dried. The results are set forth in Table 3 below.

TABLE 3

| Expt. # | 1-Decene | Polymer yield, g | Conv'n % | $M_w$ | $M_n$ |
|---|---|---|---|---|---|
| 17 | no | 2.7 | 54 | 141,000 | 70,200 |
| 18 | yes | 3.4 | 68 | 92,400 | 39,100 |

In addition to the reduction in molecular weight the 1-decene caused the polymer in experiment 18 to be terminated with an olefinic group observed by proton NMR methods (signals observed in the region of about 4.5 to about 6 ppm relative to TMS).

EXAMPLE 19

Catalyst D in the homopolymerization of NB

To a 50 ml glass vial was added norbornene (5 g, 53.1 mmol) and 1,2-dichloroethane (10 ml). To this solution was added catalyst D (11 mg, 0.026 mmol) dissolved in dichloroethane (1 ml). Upon addition (at ambient temperature) the solution became cloudy and after 1 minute the solution became viscous, indicating polymer formation. The reaction was allowed to run for 24 hours after which the vessel was a solid plug of polymer. Methanol was injected to terminate the reaction and the polymer was washed with excess methanol and dried. The yield of poly(norbornene) was 4.6 g, 92% yield. The molecular weight was 13,200 ($M_n$) and 44,500 ($M_w$).

EXAMPLE 20

Catalyst E in the homopolymerization of NB

To a 100 ml glass vial was added norbornene (5 g, 53.1 mmol) and 1,2-dichloroethane (40 ml). To this solution was added catalyst E (5.4 mg, 0.013 mmol) dissolved in dichloroethane (3 ml). Upon addition (at ambient temperature) the solution became cloudy and after about 1 minute the solution became viscous, indicating polymer formation. The reaction was allowed to run for 24 hours after which the vessel was a solid plug of polymer. Acetone was injected to terminate the reaction and the polymer was washed with excess acetone and dried. The yield of poly(norbornene) was 3.3 g, 66% yield.

EXAMPLE 21

Catalyst F using propylene as CTA

To a 500 ml stirred, stainless steel pressure vessel was added a solution of norbornene (100 g, 1.06 mol) in toluene (40 ml) followed by propylene (126 g, 3.0 mol). Into this pressure vessel was injected catalyst F (nickelethylhexanoate, 0.55 g, 1.2 mmol in mineral spirits) dissolved in toluene (20 ml) followed by MAO (20 ml, 44 mmol) in toluene (15 ml). After addition of the MAO there was an immediate exotherm (peaking at 50° C.) which was controlled by cooling the reactor by circulating chilled water through the jacket. After 90 mins the reaction was stopped by injecting methanol. After venting the excess propylene, the polymer was precipitated by adding to a large volume of methanol and the polymer was washed with methanol and dried to afford 25.7 g of the product (25% conversion). The molecular weight was 3,680 ($M_n$) and 6,520 ($M_w$). In addition to the reduction in molecular weight the propylene caused the polymer to be terminated with an olefinic group observed by proton NMR methods (signals observed in the region of about 4.8 to about 6 ppm relative to TMS).

EXAMPLE 22

Catalyst from without CTA

Comparative Example

To a 500 ml stirred serum bottle was added a solution of norbornene (50 g, 0.53 mol) in toluene. Into this solution was injected catalyst F (nickelethylhexanoate, 0.12 mmol in mineral spirits) dissolved in cyclohexane (1 ml) followed by methaluminoxane (5 ml of a 10% w solution in toluene). After 90 min the reaction was stopped by injecting ethanol. The polymer was precipitated by adding to a large volume of methanol and the polymer was washed with methanol and dried to afford 31.6 g of the product (63% conversion). The molecular weight was 1,030,000 ($M_w$) and 597,000 ($M_n$).

EXAMPLE 23

Copolymerization of NB and cyclopentene

This hydrocarbon-soluble modification of the Sen/Risse catalyst is not described in the literature, but is presented to show that, had they known an α-olefin is an effective CTA, they would likely have amended the statement "The polymerization of norbornene proceeds without termination and chain transfer to give polynorbornene with a very narrow molecular weight distribution [polydispersity index (PDI)= $M_w/M_n$<1.1]."

To a 50 ml glas vial was added norbornene (5 g, 53.1 mmol) and cyclopentene (5 ml). To this solution was added a solution of catalyst H (100 mg, 0.128 mmol) in toluene (1 ml). The reaction was allowed allowed to stir for 24 hours at ambient temperature after which methanol was injected to terminate the reaction and the polymer was washed with excess methanol and dried. The yield of polymer was 4.5 g. The resulting polymer was characterized using NMR techniques as a norbornene/cyclopentene copolymer and was terminated with an olefinic group.

EXAMPLE 24

Catalyst A with ethylene as Mw modifier

To a 500 ml stirred, stainless steel pressure vessel was added a solution of norbornene (75 g, 0.8 mol) in 1,2-dichloroethane (200 ml) followed by ethylene (300 psi). Into this pressure vessel was injected catalyst A (73 mg, 0.2 mmol) dissolved in 1,2-dichloroethane (4 ml). After one hour the reaction was stopped by venting the ethylene and injecting ethanol (2 ml). The polymer slurry was worked up by adding to an excess of ethanol, filtering, washing the polymer with ethanol, air drying and then drying the product under vacuum, at 80° C. for 20 hr. The polymer yield was 38.7 g (54%). The molecular weight was 2,120 ($M_n$) and 2,840 ($M_w$). In addition to the reduction in molecular weight the ethylene caused the polymer to be terminated with an olefinic (vinyl) group observed by proton NMR spectroscopy. Resonances are observed at 5.35 ppm relative to tetramethylsilane using a solution in perdeuterated o-dichlorobenzene at 110° C. The 5.35 ppm corresponds to two overlapping protons of a 1,2-disubstituted double bond. The $T_g$ of the material was 170° C.

EXAMPLE 25

Catalyst A in copolymerization of methylNB and decylnorbornene using decene-1 as Mw modifier This polymerization was run in a 50 ml glass vial, at ambient temperature in 1,2-dichloroethane (25 ml) using a magnetic stir bar for agitation. The components were added in the following order: 5-methylnorbornene (2.03 g, 18.8 mmol), 5-decylnorbornene (1.46 g, 6.25 mmol), decene-1 (0.043 g, 0.31 mmol), 1,2-dichloroethane, catalyst A (4.4 mg, 0.012 mmol dissolved in 0.5 ml 1,2-dichloroethane). The reaction was run for 1 hour after which methanol was injected to terminate the reaction and the polymer was washed with excess methanol and dried. The yield of polymer was 2.02 g (58% conversion) and the molecular weight was 20,000 ($M_n$) and 71,000 ($M_w$).

EXAMPLE 26

Catalyst I in solution homopolymerization of NB

To a 100 ml glass vial was added norbornene (5 g, 53.1 mmol) and toluene (5 ml). To this solution was added the solution of catalyst I in toluene (2 ml). Within 1 minute the reaction mixture became hot and stirring stopped due to the high viscosity caused by polymer formation. After 10 mins the reaction was stopped and the polymer was dissolved in toluene (400 ml) and precipitated with methanol and filtered. The polymer was then redissolved in toluene, reprecipitated with methanol, washed with methanol and dried to afford the polymer (3.5 g, 70% conversion). The polymer has a $T_g$ of about 400° C. and molecular weight of $M_w$ 520,000, $M_n$ 128,000.

EXAMPLE 27

Catalyst I in homopolymerization of NB

To a 100 ml glas vial was added norbornene (5 g, 53.1 mmol) and 1,2-dichloroethylene (50 ml). To this solution was added the solution of catalyst I in toluene (2 ml). The polymer started to form immediately and precipitated from solution. The contents of the reaction flask were added to excess methanol, washed with methanol and dried to afford the polymer (4.2 g, 84% conversion). The polymer has a $T_g$ of about 384° C.

EXAMPLE 28

Catalyst using ethylene as CTA

To a 500 ml stirred, stainless steel pressure vessel was added a solution of norbornene (30 g, 0.32 mol) in toluene (250 ml) followed by propylene (250 psi). Into this pressure vessel was injected catalyst F (nickelethylhexanoate, 0.046 g, 0.1 mmol in mineral spirits) dissolved in toluene (5 ml) followed by methaluminoxane (14.8 mmol) in toluene (5 ml). After 40 minutes the reaction was stopped by injecting methanol. After venting the excess ethylene, the polymer was precipitated by adding to a large volume of methanol and the polymer was washed with methanol and dried to afford 15.1 g of the product. The product was a homopolymer of norbornene terminated with a vinyl group originating from the ethylene molecular weight modifier. The olefinic (vinyl) end group observed by proton NMR methods (signals observed in the region of about 4.8 to about 6 ppm relative to TMS).

EXAMPLES 29–34

Catalyst A with different levels of either dodecyl or hexadecyl norbornene comonomer and decene-1

The following examples demonstrate the effects of an α-olefin and a 5-alkylnorbornene comonomer on polymer glass transition temperature and molecular weight. All the polymerizations were run, in 100 ml glass vials, at ambient temperature in 1,2-dichloroethane (40 ml) using a magnetic stir bar for agitation. The components were added in the following order: norbornenes, decene-1, 1,2-dichloroethane, catalyst A (4.6 mg dissolved in 3 ml 1,2-dichloroethane). The reactions were run for 1 hour after which methanol was injected to terminate the reaction and the polymer was washed with excess methanol and dried. The results are set forth in Table 4 below.

TABLE 4

| Ex. # | NB (g) | Decene-1 (ml) | 5-alkyl-NB (type, ml) | Polymer yield, (g) | $M_w \times 10^3$ | $M_n \times 10^3$ | $T_g$, °C. |
|---|---|---|---|---|---|---|---|
| 29 | 4.16 | 0.1 | dodecyl, 2.41 | 1.1 | 228 | 120 | 272 |
| 30 | 4.4 | 0.05 | dodecyl, 1.61 | 4.95 | 322 | 142 | n.d. |
| 31 | 4.74 | 0.15 | dodecyl, 0.5 | 4.8 | 137 | 63 | n.d. |
| 32 | 4.4 | 0.1 | hexadecyl, 1.93 | 4 | 179 | 104 | 286 |
| 33 | 4.16 | 0.1 | hexadecyl, 2.9 | 4.95 | 153 | 82 | 243 |
| 34 | 3.7 | 0.1 | hexadecyl, 4.85 | 2.7 | 147 | 87 | 179 |

In a manner analogous to that which produces a hexadecyl substituent and the desired copolymer, a polymer with a $C_{20}$ (eicosyl) substituent in a repeating unit is made. Even longer chains may be used as substituents if desired, but there is no substantial difference in properties of a copolymer with >20 C atoms over one which has 16, and therefore no economic incentive to make a copolymer with a chain longer than 16 carbon atoms.

EXAMPLES 35–38

Catalyst A with different levels of decene-1

The following examples demonstrate the effects of various levels of an α-olefin (decene-1) on homopolymer molecular weight. All the polymerizations were run, in a 50 ml glass vial, at ambient temperature in 1,2-dichloroethane (25 ml) using a magnetic stir bar for agitation. The components were added in the following order: norbornene, decene-1, 1,2-dichloroethane, catalyst A (2.2 mg dissolved in 3 ml 1,2-dichloroethane). The reactions were run for 1 hour after which methanol was injected to terminate the reaction and the polymer was washed with excess methanol and dried.

The results are set forth in Table 5 below.

TABLE 5

| Ex. # | Norbornene (g, mmol) | Decene-1, (g, mmol) | Conv'n (%) | $M_w \times 10^3$ | $M_n \times 10^3$ |
|---|---|---|---|---|---|
| 35 | 2.29, 24.3 | 0.1, 0.7 | 93 | 80 | 33 |
| 36 | 2.32, 24.6 | 0.053, 0.38 | 97 | 151 | 56 |
| 37 | 2.33, 24.8 | 0.035, 0.25 | 94 | 205 | 78 |
| 38 | 2.34, 24.9 | 0.018, 0.125 | 99.6 | 354 | 130 |

EXAMPLE 39

Use of Catalyst A with commercially available NB.

This example is presented as evidence of the excellent resistance to deactivation exhibited by the novel catalysts. Commercially available NB is used as received, without any pretreatment to remove impurities which might be present. The NB produced a homopolymer with excellent conversion. This demonstrates the substantial immunity of the catalyst to impurities conventionally present in commercial NB.

A procedure analogous to that in examples 35 to 38 was used here, except that the NB was used as received (from Aldrich Chemical Company). The high conversion demonstrates the high tolerance of these catalysts towards impurities.

The results are set forth in Table 6 below.

TABLE 6

| Ex. # | Norbornene (g, mmol) | Decene-1, (g, mmol) | Conv'n (%) | $M_w \times 10^3$ | $M_n \times 10^3$ |
|---|---|---|---|---|---|
| 39 | 2.32, 24.6 | 0.1, 0.7 | 93 | 105 | 45 |

EXAMPLES 40–42

(Comparative Examples)

The attempted polymerizations were run, in a 50 ml glass vial, at ambient temperature in toluene (25 ml) using a magnetic stir bar for agitation. The components were added in the following order: norbornene, diluent, catalyst. No molecular weight modifier was used. The reactions were run for 3 hours. With these exceptions the procedure used was that of examples 35–38. At the end of 3 hours methanol was injected to kill the reaction, in every case no polymer was formed.

In experiment 40 catalyst J was used with toluene as the reaction solvent. This illustrates that an anionic nickel complex is ineffective in the polymerization of norbornene. In experiment 41 catalyst K was used and in experiment 42 bis(cyclooctadiene)nickel was used, in both cases dichloroethane was applied as the reaction diluent. These two experiments illustrate that neutral nickel complexes and those with more-coordinating anions (trifluoroacetate) are ineffective catalysts for the polymerization of norbornene.

EXAMPLE 43

This example demonstrates the copolymerization of norbornene and ethylidenenorbornene (ENB). The polymerization was run, in a 100 ml glass vial, at ambient temperature in 1,2-dichloroethane (50 ml) using a magnetic stir bar for agitation. The components were added in the following order: norbornene (4.2 g, 45 mmol, used as received without further purification), ENB (0.6 g, 5 mmol), decene-1 (0.14 g, 1 mmol), 1,2-dichloroethane, catalyst A (9.2 mg dissolved in 5 ml 1,2-dichloroethane). The reaction was run for 1 hour after which ethanol was injected to kill the reaction and the polymer was washed with excess acetone and dried. The polymer was characterized by proton NMR methods and found to contain 7% mole of ENB.

EXAMPLE 44

This example demonstrates the homopolymerization of ethylidenenorbornene (ENB). The polymerization was run, in a 50 ml glass vial, at ambient temperature using a magnetic stir bar for agitation. The components were added in the following order: ENB (12 g, 100 mmol), and catalyst A (18 mg dissolved in 1 ml 1,2-dichloroethane). The reaction was run for 1 hour after which ethanol was injected to kill the reaction and the polymer was dissolved in toluene and precipitated with acetone, washed with acetone and dried in vacuum to afford the product, poly(ethylidenenorbornene) (8.4 g, 70% yield) as a white powder.

EXAMPLE 45

To a 50 ml glass vial equipped with a magnetic stir bar was added norbornene (7.5 g, 80 mmol), tetracyclododecene (3.2 g, 20 mmol) and 1,2-dichloroethane (25 ml). To this stirred mixture (a colorless liquid) was added, at ambient temperature, catalyst A (9 mg in 1 ml methylene chloride). Polymer precipitates from solution within 2 min and the reaction was terminated after 60 min. The resulting polymer was not further characterized.

EXAMPLE 46

To a 50 ml glass vial equipped with a magnetic stir bar was added norbornene (8.5 g, 90 mmol), methyltetracyclododecene (1.7 g, 10 mmol) and 1,2-dichloroethane (25 ml). To this stirred mixture (a colorless liquid) was added, at ambient temperature, catalyst A (18 mg in 1 ml dichloroethane). After 90 mins the viscous solution was added to excess acetone and the polymer precipitated. The polymer was washed with excess acetone and dried. It was characterized by proton NMR methods to be a copolymer of norbornene and methyltetracyclododecene and was found to have $M_w$ 360,000 and $M_n$ 150,000.

EXAMPLES 47–51

In these examples varying levels of an α-olefin (decene-1) are used to control the molecular weight to assorted desired values. In addition various levels of 5-decylnorbornene comonomer are applied to control the polymer glass transition temperature. In each experiment a third monomer was used as a minor component, such that the resulting polymers are terpolymers. The third monomer applied in every case was the trimer of cyclopentadiene (in fact a mixture of various isomers including both symmetric and asymmetric structures) which can be prepared by heat- soaking of dicyclopentadiene followed by distillation. All the polymerizations were run, in a 50 ml glass vial, at ambient temperature in 1,2-dichloroethane (25 ml) using a magnetic stir bar for agitation. The components were added in the following order: norbornenes, decene-1, 1,2-dichloroethane, catalyst A (2.2 mg, 0.006 mmol dissolved in 0.5 ml 1,2-dichloroethane). The reactions were run for 1 hour after which methanol was injected to kill the reaction and the polymer was washed with excess methanol and dried.

In the polymer chains formed-in each of the foregoing examples, whether homopolymer or copolymer, there is essentially no repeating unit which is linked in the chain by virtue of being ring-opened as in a metathesis polymerization. By "essentially no repeating unit" is meant that there is no evidence in a NMR spectroscopic analysis of a linked ring-opened unit. From this it is concluded that there is less than 1 mol % of a ring-opened repeating unit. Therefore all addition polymers made using the process of this invention are characterized by having less than 1 mole % of a ring-opened comonomer, preferably less than 100 ppm.

Further, addition polymers of this invention are made in yields of at least 80 mol % conversion of monomers to polymer, preferably more than 90 mol %, and most preferably more than 95 mol %.

EXAMPLE 53

To a 50 ml glass vial equipped with a magnetic stir bar was added norbornene (7.5 g, 80 mmol), 1-decene (0.072 g, 0.5 mmol) and 1,2-dichloroethane (20 ml). To this stirred solution was added, at ambient temperature, catalyst L (15 mg in 5 ml 1,2-dichloroethane). After 1 hour the reaction was stopped by adding ethanol and the polymer was was isolated by adding to a large excess of acetone, filtered, washed and dried.

EXAMPLE 54

To a 100 ml glass vial equipped with a magnetic stir bar was added norbornene (15 g, 160 mmol), 1-decene (0.144 g, 1 mmol) and 1,2-dichloroethane (20 ml). To this stirred solution was added, at ambient temperature, catalyst M. After 1 hour the reaction was stopped by adding ethanol and the polymer was was isolated by adding to a large excess of acetone, filtered, washed and dried.

EXAMPLES 55–60

The following examples illustrate the large conversion-enhancing effect of using a polar diluent (1,2-dichloroethane, DCE, was used) rather than a non-polar hydrocarbon (toluene, TOL, was used in the examples) when (co)polymerizing norbornenes using a catalyst comprising a group VIII metal salt in combination with a methaluminoxane. In every example nickel ethylhexanoate (catalyst F) was used

TABLE 7

| Ex. # | Norbornene (g, mmol) | Decene-1, (g, mmol) | 5-Decyl-norbornene, (g, mmol) | CPD trimers, (g, mmol) | Poly. yield, (g) | Conv (%) | $M_w \times 10^3$ | $M_n \times 10^3$ | $T_g$, °C. |
|---|---|---|---|---|---|---|---|---|---|
| 47 | 2.2, 23.3 | 0.07, 0.5 | 0.276, 1.19 | 0.012, 0.06 | 2.22 | 89 | 106 | 50 | 337 |
| 48 | 2.32, 24.6 | 0.035, 0.25 | 0.03, 0.125 | 0.001, 0.006 | 2.16 | 92 | 195 | 80 | 353 |
| 49 | 2.31, 24.5 | 0.053, 0.38 | 0.03, 0.125 | 0.001, 0.006 | 2.18 | 93 | 124 | 44 | 351 |
| 50 | 2.25, 23.9 | 0.053, 0.38 | 0.17, 0.71 | 0.008, 0.04 | 2.19 | 90 | 125 | 54 | 356 |
| 51 | 1.98, 21.1 | 0.018, 0.125 | 0.832, 3.56 | 0.037, 0.19 | 2.49 | 87 | 310 | 129 | 285 |

EXAMPLE 52

To a 100 ml glass vial equipped with a magnetic stir bar was added norbornene (4 g, 42.5 mmol), dichloroethane (40 ml) and 5-nonafluorobutylnorbornene (3.3 g, 10.62 mmol). To this stirred solution was added, at ambient temperature, catalyst A (13 mg, 0.035 mmol in 2 ml dichloroethane). Immediately upon addition of the catalyst polymer started to precipitate from solution. After 90 minutes the slurry was added to excess acetone and the polymer was collected by filtration. The polymer was washed with excess acetone and dried. The yield of the copolymer was 5.4 g (74%). The product was characterized by IR and NMR methods ($^1H$, $^{13}C$ and $^{19}F$) as being a copolymer of norbornene and 5-nonafluorobutylnorbornene, and exhibited a $T_g$ of 303° C. Other ($C_1$–$C_{20}$)haloalkyl substituents having at least one halogen substituent and preferably plural substituents, most preferably perfluoro substituents having all H atoms in the alkyl group substituted with chlorine or fluorine, less preferably with bromine and iodine.

in combination with methaluminoxane (MAO, 10% solution in toluene). All examples were (co-)polymerizations of norbornene (NB) and 5-decylnorbornene (NB-10).

The $T_g$ of the polymer from example 58 was 170° C.

Though conversion of monomer(s) to polymer in a non-polar hydrocarbyl solvent are generally about 80 mole %, the conversion of some monomers to homopolymers, and of some combinations of monomers to copolymers may be in the range from 40–50 mole %. Such non-polar solvents are typically ($C_3$–$C_{12}$)alkyl, aryl or ($C_7$–$C_{20}$)-aralkyl solvents. In those instances where the conversion in a non-polar hydrocarbyl solvent are less than 50 mole %, at least a 50% improvement in conversion is realized in a polar halohydrocarbyl solvent. Such polar solvents are typically halo($C_1$–$C_4$)alkyl, and ($C_7$–$C_{20}$)-aralkyl solvents. Effective polar hydrocarbyl solvents are methylene chloride, 1,1,1-trichloroethane ethane, perchloroethylene and haloaryl solvents such as chlorobenzene, dichlorobenzene and trichlorobenzene. In some instances the conversion can be doubled, that is a 100% improvement can be realized, by choice of the optimum polar solvent.

TABLE 8

| Ex. # | Cat. F, mmol | MAO, ml. | Diluent | NB, g, mmol | NB-10, g, mmol | NB-10, mol % | Time, h | Polymer Yield, g | Conv'n. % |
| --- | --- | --- | --- | --- | --- | --- | --- | --- | --- |
| 55 | 13 × 10⁻³ | 1 | TOL | 3.7, 39.8 | 3.1, 13.3 | 25 | 2 | 1.8 | 26 |
| 56 | 13 × 10⁻³ | 1 | DCE | 3.7, 39.8 | 3.1, 13.3 | 25 | 2 | 6.2 | 91 |
| 57 | 13 × 10⁻³ | 1 | TOL | 2.5, 26.5 | 6.2, 26.5 | 50 | 2 | 0.85 | 9.7 |
| 58 | 13 × 10⁻³ | 1 | DCE | 2.5, 26.5 | 6.2, 26.5 | 50 | 2 | 7.7 | 89 |
| 59 | 12 × 10⁻³ | 1 | TOL | 0, 0 | 5.8, 25 | 100 | 24 | 0.8 | 14 |
| 60 | 6.5 × 10⁻³ | 0.5 | DCE | 0, 0 | 6.2, 26.5 | 100 | 2 | 3.8 | 61 |

EXAMPLE 61

To a 50 ml glass vial equipped with a magnetic stir bar was added norbornene (1.8 g, 18.8 mmol), 1-decene (0.04 g, 0.31 mmol), 5-decylnorbornene (1.46 g, 6.2 mmol) and 1,2-dichloroethane (25 ml). To this stirred solution was added, at ambient temperature, catalyst C (13.2 mg, 0.012 mmol in 2 ml 1,2-dichloroethane). After 1 hour the reaction was stopped by adding ethanol and the polymer was was isolated by adding to a large excess of acetone, filtered, washed and dried (yield 2.65 g, 81%).

EXAMPLE 62

The procedure used in Examples 49–53, in which the polymerizations were run in a 50 ml glass vial, at ambient temperature in 1,2-dichloroethane (25 ml) was repeated, substituting the same molar equivalents of norbornadiene for the trimer used in each example, and in each case, a terpolymer was obtained which had about the same $T_g$ as the corresponding terpolymer with trimer.

EXAMPLE 63

(Comparative Example)

To a 100 ml glass vial was added norbornene (5 g, 53.1 mmol) and hexane (45 ml). To this solution was added catalyst N (manganese Lin-All in mineral spirits) (0.024 g, 0.026 mmol) followed by MAO (1.0 ml of a 10% solution in toluene). After 90 minutes the reaction was stopped by adding ethanol. The mass of polymer was thoroughly washed with acetone and methanol and then dried in a vacuum oven. The polymer yield was roughly 1.5 g (30%). The polymer was characterized by proton NMR methods (o-dichlorobenzene solvent) to contain a high level of backbone olefinic unsaturation indicative of ROMP polymerization. Indeed the polymer composition corresponded to about 80% ring-opening (ROMP) and only 20% addition.

EXAMPLE 64

(Comparative Example)

To a 100 ml glass vial was added norbornene (5 g, 53.1 mmol) and toluene (75 ml). To this solution was added catalyst O (molybdenum Hex-Cem in mineral spirits) (0.016 g, 0.026 mmol) and decene-1 (1 ml) followed by MAO (1.0 ml of a 10% solution in toluene). After 90 minutes the reaction was stopped by adding ethanol. The resulting mass was a very viscous gel, indicating high conversion. A sample of the polymer was precipitated from solution with methanol and then thoroughly washed with acetone and methanol and then dried in a vacuum oven. The polymer was characterized by proton NMR methods (o-dichlorobenzene solvent) to contain a high level of backbone olefinic unsaturation indicative of ROMP polymerization. Indeed the polymer composition corresponded to about 75% ring-opening (ROMP) and only 25% addition.

We claim:

1. In an essentially anhydrous reaction mixture in which a processable addition polymer is formed by coordination polymerization, said reaction mixture including at least one multi-ringed monoolefinically unsaturated cycloolefin monomer selected from the group consisting of bicyclo [2.2.1.]hept-2-ene ("norbornene" "NB") and substituted embodiments thereof, wherein said substituents, if present, are selected from the group consisting of $(C_1-C_{20})$alkyl, $(C_1-C_{20})$haloalkyl, $(C_5-C_{12})$cycloalkyl, $(C_1-C_6)$alkylidenyl, aryl, haloaryl, $(C_7-C_{15})$aralkyl, $(C_7-C_{15})$haloaralkyl, $(C_3-C_{20})$alkenylyl, and $(C_4-C_{20})$alkylene with the proviso that the double bond is not a terminal double bond, a solvent for said monomer, and, a single component ionic catalyst of a Group VB, VIB, VIIB or VIII metal in an amount effective to convert said at least one monomer into said addition polymer, the improvement consisting essentially of, a minor molar amount relative to the moles of said monomer, of an olefinic chain transfer agent selected from the group consisting of ethylene and a compound having a single olefinic non-styrenic double bond between adjacent carbon atoms together having at least 3 hydrogen atoms, said olefinic chain transfer agent being present in a predetermined amount correlatable with a desired number average molecular weight Mw in the range from about 20,000 to about 500,000, of said addition polymer.

2. The reaction mixture of claim 1 wherein said olefinic chain transfer agent is selected from the group consisting of an essentially linear $(C_2-C_{20})$-alpha-olefin; a branched acyclic $(C_4-C_{20})$-alpha-olefin; a $(C_5-C_{12})$-cyclomonoolefin having a hydrocarbyl sidechain with a single terminal double bond; and a diolefin having non-conjugated double bonds, provided at least one bond of said diolefin is a terminal double bond.

3. The reaction mixture of claim 2 wherein said monomer is a first monomer selected from the group consisting of norbornene (NB) and substituted norbornene;

said polymer is a homopolymer; and, said olefinic chain transfer agent is present in an amount less than 10 mole % relative to said multi-ringed monomer.

4. The reaction mixture of claim 2 wherein said monomer is a first monomer selected from the group consisting of norbornene and substituted norbornene present in a major amount relative to a second monomer; said polymer is a copolymer of said first and second monomers; and, said olefinic chain transfer agent is present in an amount less than 10 mole % relative to said multi-ringed monomer.

5. The reaction mixture of claim 4 wherein said second monomer is selected from the group consisting of (i) a multi-ringed cyclomonoolefin structure derived from at least one norbornene unit, said structure including up to four fused rings; (ii) a cyclodiolefin having one norbornene unit; (iii) a mono($C_4$–$C_8$)cycloolefin; (iv) norbornadiene and (v) trimer of cyclopentadiene.

6. The reaction mixture of claim 5 wherein one of said rings has a substituent selected from the group consisting of an acyclic ($C_1$–$C_{20}$)alkyl, acyclic ($C_1$–$C_{20}$)haloalkyl, ($C_3$–$C_{20}$)alkenyl, ($C_5$–$C_{12}$)cycloalkenyl, and an ($C_1$–$C_6$)alkylidene substituent.

7. The reaction mixture of claim 5 wherein said copolymer is a copolymer selected from the group consisting of: (i) norbornene and substituted norbornene; (ii) said first monomer and dicyclopentadiene; (iii) said first monomer and a cyclomonoolefin selected from the group consisting of cyclopentene and cyclooctene; (iv) said first monomer, dicyclopentadiene and said cyclomonoolefin; and trimers of cyclopentadiene.

8. The reaction mixture of claim 2 wherein said single component ionic catalyst is a transition metal complex and said metal in said complex is a Group VIII metal.

9. The reaction mixture of claim 8 wherein said metal is selected from the group consisting of nickel, palladium, cobalt and platinum.

10. The reaction mixture of claim 2 wherein said solvent is a polar hydrocarbyl solvent.

11. The reaction mixture of claim 10 wherein said olefinic chain transfer agent is selected from the group consisting of a ($C_2$–$C_{20}$)-α-olefin and a hydrocarbyl group having an olefinic sidechain with a terminal double bond, and, said metal in said organo-Group VIII metal complex catalyst is selected from nickel and palladium.

12. The reaction mixture of claim 11 wherein said hydrocarbyl group having an olefinic sidechain is selected from the group consisting of a ($C_5$–$C_{12}$)cycloalkane having a ($C_2$–$C_{20}$)-α-olefin sidechain, and a ($C_6$–$C_{10}$)aryl having a ($C_3$–$C_{20}$)-α-olefin sidechain.

13. The reaction mixture of claim 12 wherein said monomer is a substituted norbornene having at least one substituent selected from the group consisting of $C_1$–$C_{20}$-alkyl, $C_2$–$C_{20}$-haloalkyl, and ethylidene, and said addition polymer is a homopolymer.

14. The reaction mixture of claim 13 wherein, said substituted norbornene is a 5- (or 6)-alkylnorbornene; said haloalkyl group has from 4 to 20 carbon atoms wherein said halo substituent is selected from the group consisting of chlorine and fluorine; and, said alkyl group has from 4 to 16 carbon atoms.

15. The reaction mixture of claim 13 wherein said monomer includes in addition to said substituted norbornene, a substituted tetracyclododecene having at least one substituent selected from the group consisting of $C_1$–$C_{20}$-alkyl, $C_2$–$C_{20}$-haloalkyl, and ethylidene, and, said addition polymer is a copolymer having a major molar amount of said substituted norbornene and a minor molar amount of said substituted tetracyclododecene.

16. The reaction mixture of claim 4 wherein said first monomer is norbornene or a first substituted norbornene, and said second monomer is a second substituted norbornene; wherein each substituted monomer is selected from the group consisting of norbornene and tetracyclododecene, each having at least one substituent selected from the group consisting of $C_1$–$C_{20}$-alkyl, $C_2$–$C_{20}$-haloalkyl and ethylidene; and, said addition polymer is a copolymer.

17. The reaction mixture of claim 16 wherein said substituted norbornene is a 5- (or 6)-alkylnorbornene having from 4 to 20 carbon atoms.

18. The reaction mixture of claim 17 wherein said substituted monomer is selected from the group consisting of hexylnorbornene, decylnorbornene, dodecylnorbornene, hexadecylnorbornene, ethylidene norbornene, decyltetracyclododecene, nonafluorobutylnorbornene, dodecyltetracyclododecene, hexadecyltetracyclododecene, and, ethylidene tetracyclododecene.

19. An essentially anhydrous reaction mixture in which a processable addition polymer is formed, said reaction mixture comprising, (a) a multi-ringed monoolefinically unsaturated cycloolefin monomer selected from the group consisting of norbornene ("NB" or bicyclo[2.2.1.]hept-2-ene) and substituted embodiments thereof, wherein said substituents, if present, are selected from the group consisting of ($C_1$–$C_{20}$)alkyl, ($C_1$–$C_{20}$)haloalkyl, ($C_5$–$C_{12}$)cycloalkyl, ($C_1$–$C_6$)alkylidenyl, aryl, haloaryl, ($C_7$–$C_{15}$)aralkyl, ($C_7$–$C_{15}$)haloaralkyl, ($C_3$–$C_{20}$)alkenylyl, and ($C_4$–$C_{20}$)alkylene with the proviso that the double bond is not a terminal double bond, (b) a pre-formed single component complex metal catalyst of a Group VIII metal which initiated and maintains chain growth of a polymer by an insertion reaction which occurs with the first monomer only subsequent insertions being of the monomer into the growing chain, in combination with (c) a predetermined amount of a monoolefinic chain transfer agent, in the absence of an organometal cocatalyst, said pre-formed single component catalyst consisting essentially of
  (i) a cation of said organo Group VIII metal complex, and,
  (ii) a weakly coordinating counteranion; said cation having a hydrocarbyl group directly bound to said Group VIII metal by a single metal-C θ bond, and by not more than three π-bonds, to a weakly coordinating neutral donating ligand, and, (d) a non-aggressive solvent in which said cycloolefin monomer, said catalyst and said chain transfer agent are soluble.

20. The reaction mixture of claim 19 wherein said preformed single component organometal complex catalyst is represented by

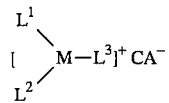

structure I wherein,

M represents Ni or Pd, $L^1$, $L^2$ and $L^3$ represent ligands to M;

only one ligand has a η-bond, and all the ligands together have 2 or 3 π-bonds; and, CA⁻ represents a counter anion chosen to solubilize said cation in said solvent.

21. The reaction mixture of claim 20 wherein M represents Ni, and said weakly coordinating neutral donating ligand is selected from the group consisting of a cyclo($C_6$–$C_{12}$)alkadiene, norbornadiene and cyclo($C_{10}$–$C_{20}$)triene.

22. The reaction mixture of claim 21 wherein said monoolefinic chain transfer agent is a $C_2$–$C_{20}$-α-olefin.

23. The reaction mixture of claim 21 wherein said weakly coordinating counteranion is selected from the group consisting of $BF_4^-$; $PF_6^-$; $AlF_3O_3SCF_3^-$; $SbF_6^-$; and $B[C_6H_3(CF_3)_2]_4^-$.

24. In an essentially anhydrous reaction mixture in which a processable addition polymer is formed by coordination polymerization, said reaction mixture including at least one multi-ringed monoolefinically unsaturated cycloolefin monomer selected from the group consisting of bicyclo [2.2.1.]hept-2-ene ("norbornene" "NB") and substituted embodiments thereof, wherein said substituents, if present, are selected from the group consisting of $(C_1-C_{20})$alkyl, $(C_1-C_{20})$haloalkyl, $(C_5-C_{12})$cycloalkyl, $(C_1-C_6C)$alkylidenyl, aryl, haloaryl, $(C_7-C_{15})$aralkyl, $(C_7-C_{15})$haloaralkyl, $(C_3-C_{20})$alkenylyl, and $(C_4-C_{20})$alkylene with the proviso that the double bond is not a terminal double bond, a solvent for said monomer, a single component ionic catalyst of a Group VB, VIB, VIIB, or VIII transition metal, and an alkylaluminoxane in an amount effective to convert said at least 50% by weight of one monomer into said addition polymer, the improvement consisting essentially of, a minor molar amount relative to the moles of said monomer, of an olefinic chain transfer agent selected from the group consisting of ethylene and a compound having a single olefinic non-styrenic double bond between adjacent carbon atoms together having at least 3 hydrogen atoms, said olefinic chain transfer agent being present in a predetermined amount correlatable with a desired number average molecular weight Mw in the range from about 20,000 to about 500,000, of said addition polymer.

25. The reaction mixture of claim 24 wherein said olefinic chain transfer agent is selected from the group consisting of an essentially linear $(C_2-C_{20})$-olefin; a branched acyclic $(C_4-C_{20})$-olefin; an acyclic $(C_2-C_{20})$-olefin having a terminal functional group; a $(C_5-C_{12})$cyclomonoolefin having a hydrocarbyl sidechain with a single terminal double bond; and a diolefin having non-conjugated double bonds, provided at least one bond of said diolefin is a terminal double bond.

26. The reaction mixture of claim 25 wherein said monomer is a first monomer selected from the group consisting of norbornene and substituted norbornene;

said polymer is a homopolymer; and, said olefinic chain transfer agent is present in an amount less than 10 mole % relative to said multi-ringed monomer.

27. The reaction mixture of claim 25 wherein said monomer is a first monomer selected from the group consisting of norbornene and substituted norbornene present in a major amount relative to a second monomer; said polymer is a copolymer of said first and second monomers; and, said olefinic chain transfer agent is present in an amount less than 10 mole % relative to said multi-ringed monomer.

28. The reaction mixture of claim 27 wherein said second monomer is selected from the group consisting of a multi-ringed cyclomonoolefin structure derived from at least one norbornene unit, said structure including up to four fused rings; a cyclodiolefin having one norbornene unit; a mono$(C_4-C_8)$cycloolefin; norbornadiene; and trimer of cyclopentadiene.

29. The reaction mixture of claim 28 wherein one of said rings has a substituent selected from the group consisting of an acyclic $(C_1-C_{20})$alkyl, $(C_3-C_{20})$alkenyl, or $(C_1-C_6)$alkylidene substituent.

30. In an essentially anhydrous reaction mixture in which a processable addition polymer is formed by coordination polymerization, said reaction mixture including at least one multi-ringed monoolefinically unsaturated cycloolefin monomer selected from the group consisting of bicyclo [2.2.1.]hept-2-ene ("norbornene" "NB") and substituted embodiments thereof, a solvent for said monomer, and, a single component ionic catalyst of a Group VB, VIB, VIIB or VIII metal in combination with an alkylaluminoxane cocatalyst in an amount effective to convert said at least one monomer into said addition polymer, wherein said metal is selected from the group consisting of chromium, molybdenum, tungsten, manganese, nickel, palladium and platinum, the improvement consisting essentially of, said solvent is a polar hydrocarbyl solvent; whereby the conversion of monomer to polymer is at least 100% higher than when said reactants are polymerized in an essentially non-polar solvent.

31. The reaction mixture of claim 30 wherein said polar hydrocarbyl solvent is halo$(C_1-C_4)$alkyl or haloaryl solvent.

32. The reaction mixture of claim 31 wherein said polar hydrocarbyl solvent is selected from the group consisting of methylene chloride, 1,2-dichloroethane, 1,1,1-trichloroethane, perchloroethylene chlorobenzene, dichlorobenzene and trichlorobenzene.

33. The reaction mixture of claim 31 wherein said metal is nickel.

34. The reaction mixture of claim 2 wherein said catalyst is anchored on an active catalyst support.

35. The reaction mixture of claim 34 wherein said active catalyst support is selected from the group consisting of aluminum trifluoride and an alkylaluminooxane on silica.

36. The reaction mixture of claim 2 wherein said solvent is a substantially non-polar hydrocarbyl solvent selected from the group consisting of $(C_3-C_{12})$-alkyl, aryl or $(C_7-C_{20})$-aralkyl solvent.

37. The reaction mixture of claim 6 wherein conversion of said monomer to said addition polymer is greater than 80 mole %.

38. The reaction mixture of claim 37 wherein said solvent is a substantially polar hydrocarbyl solvent selected from the group consisting of halo$(C_1-C_4)$-alkyl and haloaryl; and, said conversion of said monomer to said addition polymer is greater than 90 mole %.

39. The reaction mixture of claim 2 wherein said solvent is a substantially polar hydrocarbyl solvent selected from the group consisting of halo$(C_1-C_4)$-alkyl and haloaryl.

40. A melt-processable addition polymer having a number average molecular weight in the range from 20,000 to 500,000, of at least one multi-ringed monolefinically unsaturated cycloolefin monomer having a repeating unit derived from (i) a bicyclo[2.2.1.]hept-2-ene or norbornene and a substituted embodiments thereof wherein said substituents, if present, are selected from the group consisting of $(C_1-C_{20})$alkyl, $C_1-C_{20}$haloalkyl, $(C_5-C_{12})$cycloalkyl, $(C_1-C_6)$alkylidenyl, aryl, haloaryl, $(C_7-C_{15})$aralkyl, $(C_7-C_{15})$haloaralkyl, $(C_3-C_{20})$alkenylyl, and $(C_4-C_{20})$alkylene with the proviso that the double bond is not a terminal double bond;

(ii) norbornene and a substituted embodiments thereof, and a cyclomonoolefin selected from the group consisting of cyclopentene and cycloctene;

(iii) norbornene and a substituted embodiment thereof, and trimer of cyclopentadiene; and, (iv) norbornene and a substituted embodiment thereof, and norbornadiene; wherein chains of said polymer are terminated with an olefinic moiety derived from a chain transfer agent selected from the group consisting of ethylene and a compound having a single olefinic non-styrenic double bond between agent carbon atoms together having at least 3 hydrogen atoms, and wherein said substituents, if present, are selected from the group consisting of $(C_1-C_{20})$alkyl, $(C_1-C_{20})$haloalkyl, $(C_5-C_{12})$cycloalkyl, $(C_1-C_6)$alkylidenyl, aryl, haloaryl, $(C_7-C_{15})$aralkyl, $(C_7-C_{15})$haloaralkyl, $(C_3-C_{20})$alkenylyl, and $(C_4-C_{20})$alkylene with the proviso that the double bond is not a terminal double bond.

41. The addition polymer of claim 40 wherein one said multi-ringed monoolefinically unsaturated cycloolefin monomer is norbornene, and at least one other monomer is selected from the group consisting of (a) a 5- or (6-)substituted norbornene selected from the group consisting of $(C_1-C_{20})$alkylnorbornene, $(C_1-C_{20})$haloalkylnorbornene, and a $(C_1-C_6)$alkylidenenorbornene;

(b) 5,8-dimethano-1,2,3,4,4a,5,8,8a-octahydronaphthalene, (tetracyclododecene "TD", or, DMON) and substituted embodiments thereof having a substituent on the 6- or 7- C atoms of the rings;

(c) dicyclopentadiene and substituted embodiments thereof having a substituent on the 7- C atom of the rings;

(d) norbornadiene; and, (e) trimer of cyclopentadiene.

42. The addition polymer of claim 40 wherein, said multi-ringed monoolefinically unsaturated cycloolefin monomer is selected from the group consisting of a substituted norbornene and a substituted tetracyclododecene, each substituent being $(C_1-C_{20})$alkyl or $(C_1-C_6)$alkylidene, and said addition polymer is a homopolymer.

43. The addition polymer of claim 40 wherein, said multi-ringed monoolefinically unsaturated cycloolefin monomer is selected from the group consisting of norbornene, substituted norbornene, tetracyclododecene, and substituted tetracyclododecene, each substituent being $(C_1-C_{20})$alkyl or $(C_1-C_6)$alkylidene, and said addition polymer is a copolymer.

44. A process for making an addition homo- or copolymer of a multi-ringed monoolefinically unsaturated cycloolefin monomer selected from the group consisting of bicyclo [2.2.1.]hept-2-ene ("norbornene"), dicyclopentadiene, 5,8-dimethano-1,2,3,4,4a,5,8,8a-dimethanooctahydronaphthalene, (tetracyclododecene "TD", or, DMON) and substituted embodiments thereof wherein said substituents, if present, are selected from the group consisting of $(C_1-C_{20})$alkyl, $(C_1-C_{20})$haloalkyl, $(C_5-C_{12})$cycloalkyl, $(C_1-C_6)$alkylidenyl, aryl, haloaryl, $(C_7-C_{15})$aralkyl, $(C_7-C_{15})$haloaralkyl, $(C_3-C_{20})$alkenylyl, and $(C_4-C_{20})$alkylene with the proviso that the double bond is not a terminal double bond, said process comprising, (a) reacting said monomer in a liquid phase in the presence of a solvent for said monomer and an effective amount of a pre-formed single component organo-Group VIII metal complex catalyst, and a predetermined minor molar amount relative to the moles of said multi-ringed monomer, of an olefinic chain transfer agent selected from the group consisting of ethylene and a compound having a single olefinic non-styrenic double bond between adjacent carbon atoms together having at least 3 hydrogen atoms, said chain transfer agent being present in an amount sufficient to provide said homo- or co-polymer in a desired molecular weight in the range from 20,000 to 500,000;

(b) maintaining said reaction in the absence of an alkylaluminoxane, for a period sufficient to convert at least 50% w/w (by weight, based on the total weight of monomers charged) of said monomer to polymer; and, (c) recovering said polymer in solid melt-processable form.

* * * * *